(12) United States Patent  
Kuwabara et al.

(10) Patent No.: US 7,360,904 B2
(45) Date of Patent: Apr. 22, 2008

(54) PROJECTOR, RANGE FINDING METHOD, AND RECORDING MEDIUM ON WHICH RANGE FINDING METHOD IS RECORDED

(75) Inventors: Nobuaki Kuwabara, Hamura (JP); Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 268 days.

(21) Appl. No.: 11/066,572

(22) Filed: Feb. 23, 2005

(65) Prior Publication Data

US 2005/0190343 A1 Sep. 1, 2005

(30) Foreign Application Priority Data

Feb. 27, 2004 (JP) ............... 2004-054860

(51) Int. Cl.
*G03B 21/00* (2006.01)
*G03B 21/14* (2006.01)

(52) U.S. Cl. .......................... 353/69; 353/70
(58) Field of Classification Search ................. 353/69, 353/70

See application file for complete search history.

(56) References Cited

U.S. PATENT DOCUMENTS

| 5,434,632 | A | 7/1995 | Carmichael |
| 5,537,168 | A | 7/1996 | Kitagishi et al. |
| 6,285,349 | B1 | 9/2001 | Smith |
| 6,422,704 | B1 * | 7/2002 | Gyoten et al. ............... 353/122 |
| 6,554,431 | B1 * | 4/2003 | Binsted et al. ................. 353/28 |
| 6,932,480 | B2 * | 8/2005 | Wada et al. ................... 353/69 |
| 7,070,283 | B2 * | 7/2006 | Akutsu ......................... 353/69 |
| 7,125,122 | B2 * | 10/2006 | Li et al. ........................ 353/31 |
| 7,144,115 | B2 * | 12/2006 | Li ................................ 353/31 |
| 2005/0157270 | A1 * | 7/2005 | Muraoka et al. .............. 353/70 |

FOREIGN PATENT DOCUMENTS

| EP | 0 689 353 A2 | 12/1995 |
| EP | 1 107 052 A1 | 6/2001 |
| JP | 2003-204495 A | 7/2003 |

* cited by examiner

*Primary Examiner*—Christopher Mahoney
(74) *Attorney, Agent, or Firm*—Frishauf, Holtz, Goodman & Chick, P.C.

(57) ABSTRACT

A projector wherein chart images are stored in an image storing section, the chart images have range-finding light-dark patterns expressing particular shapes and also used as advertisements, the chart images are selectively read from the image storing section, the chart image is then projected and displayed on a screen using a projecting system including a spatial optical modulating element and a projection lens, then, the distances to measurement points on an image projected surface are measured using phase difference sensors and a range finding processing section, thus, until the range finding is finished, for example, a company log can be advertised by utilizing the pattern shape of the chart image projected and displayed on the screen.

6 Claims, 15 Drawing Sheets

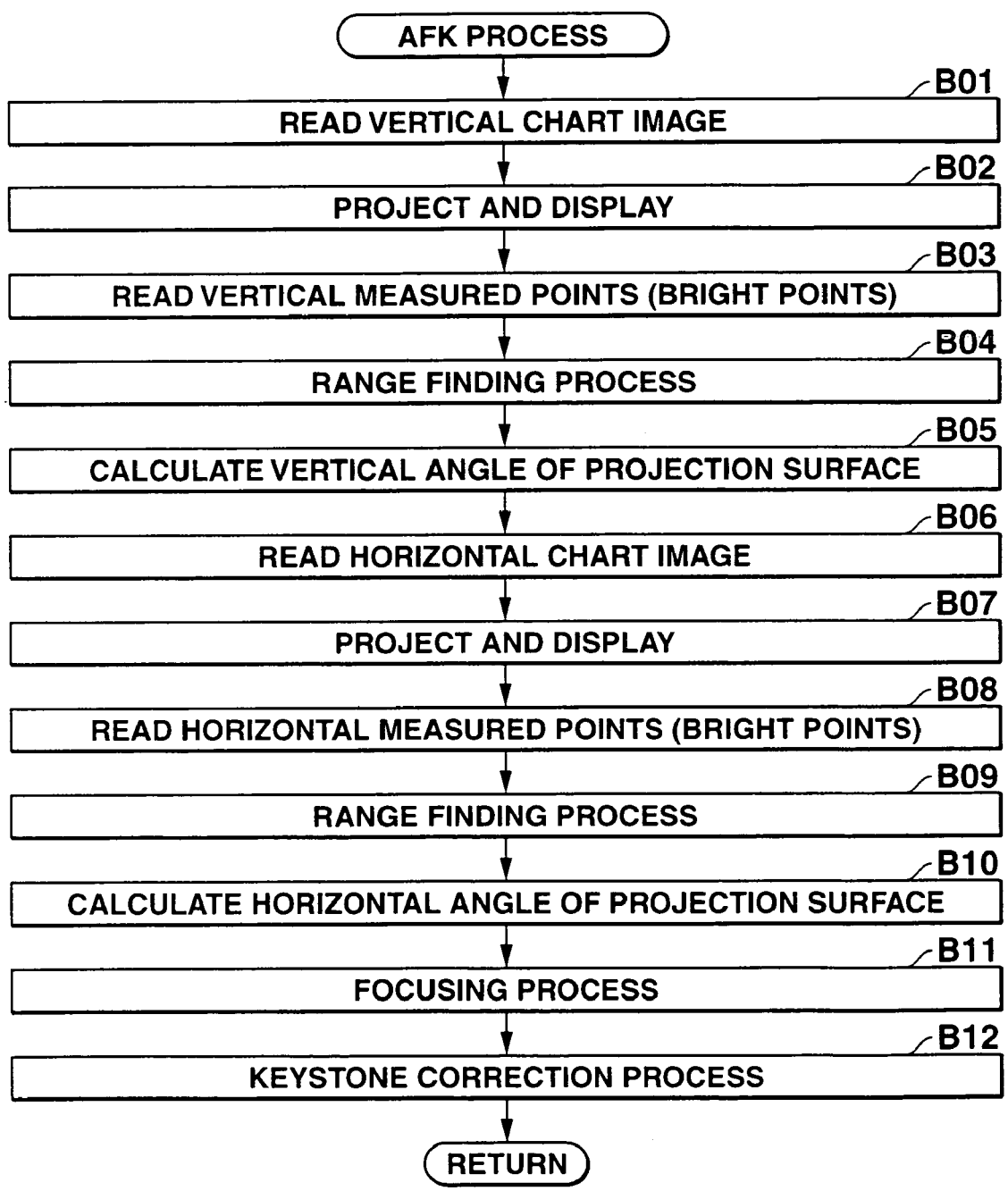

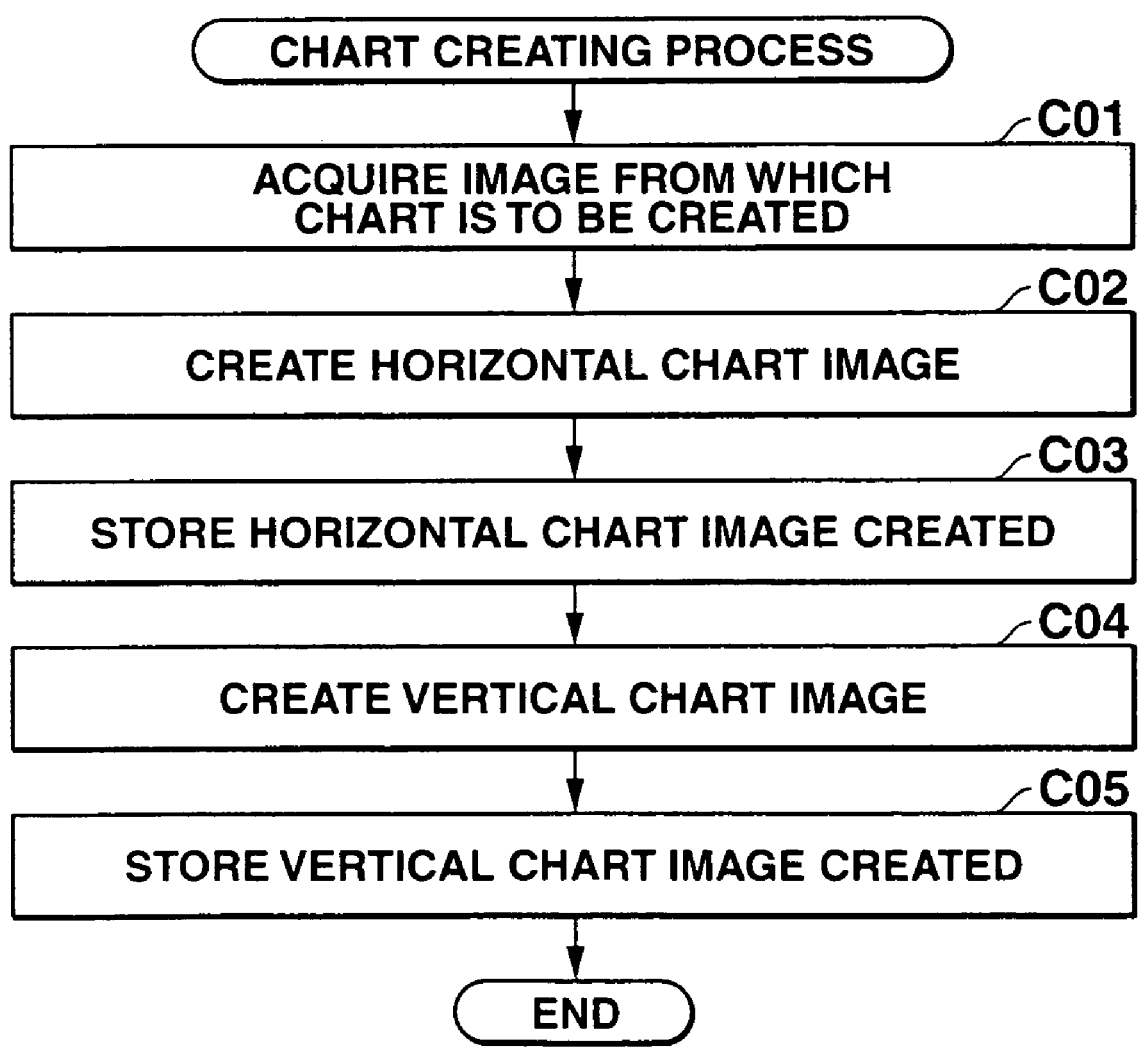

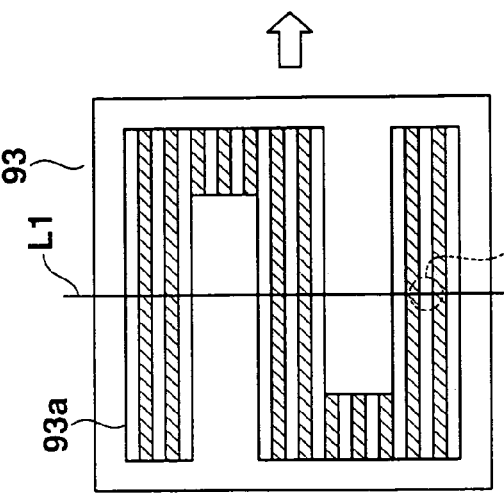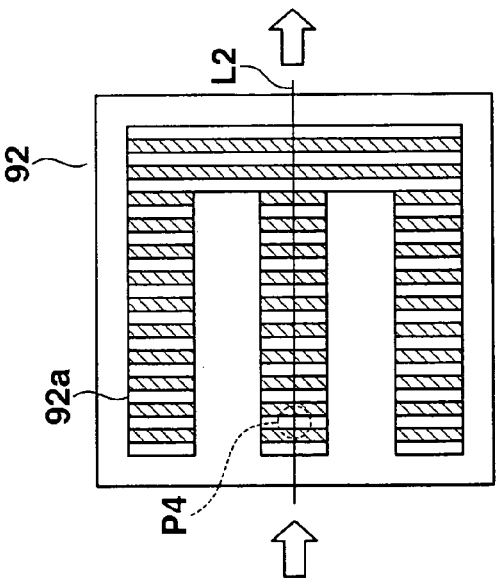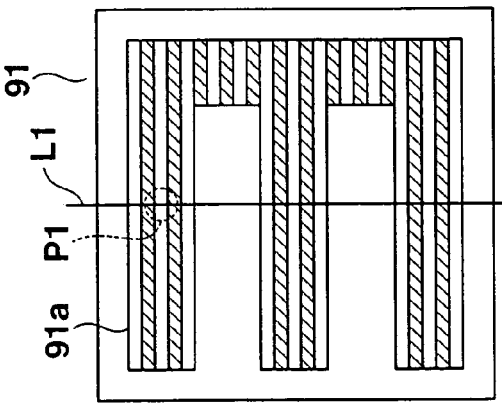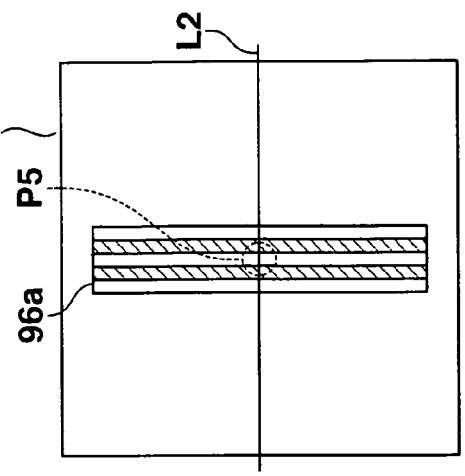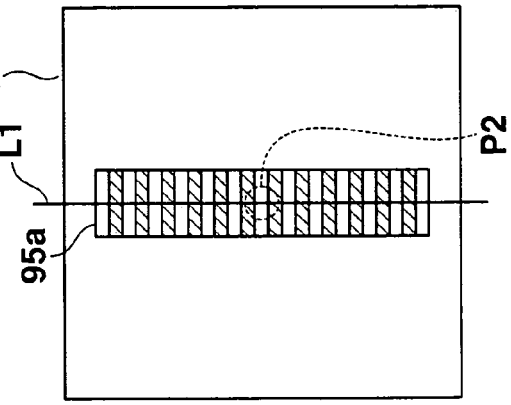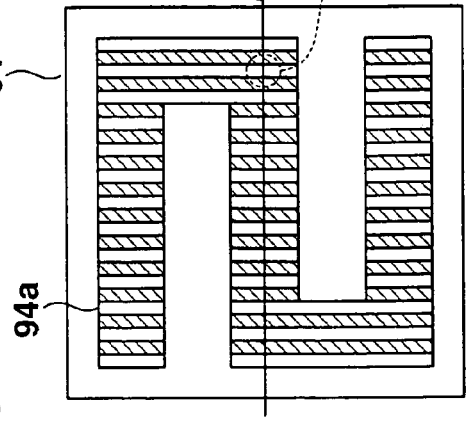
FIG.12A  FIG.12B  FIG.12C
FIG.12D  FIG.12E  FIG.12F

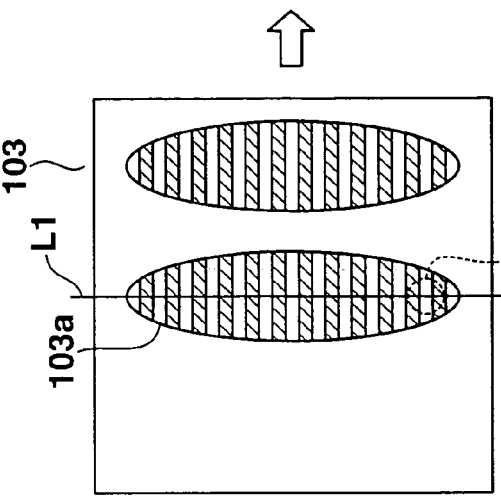
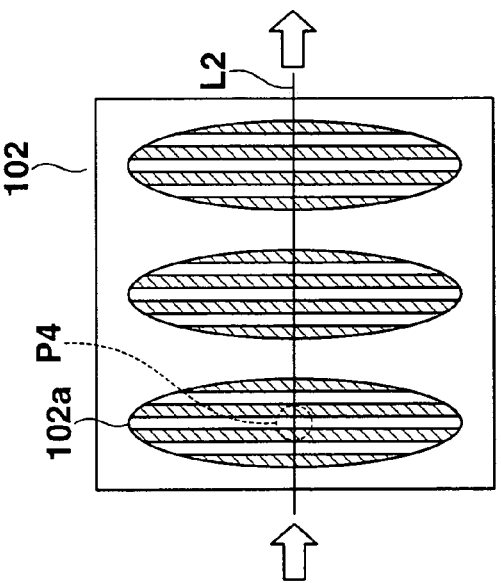
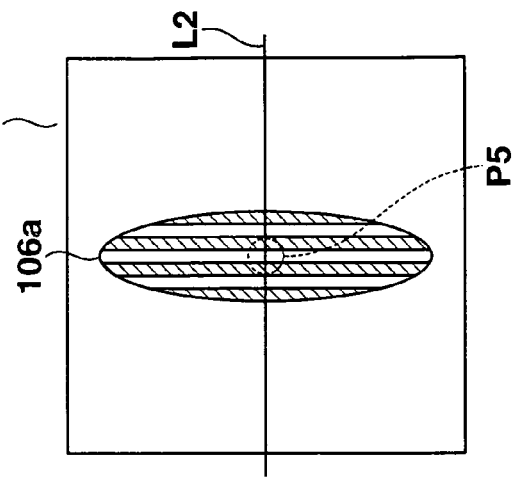
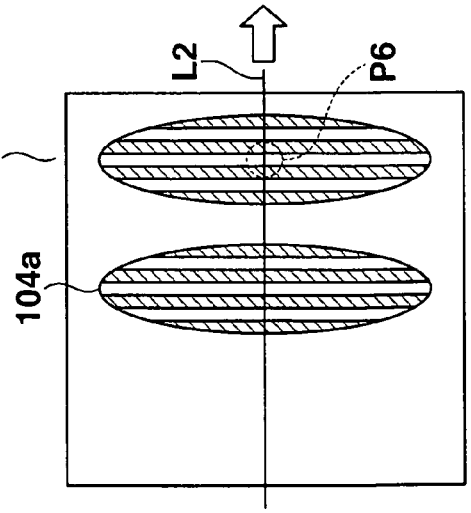

PROJECTOR, RANGE FINDING METHOD, AND RECORDING MEDIUM ON WHICH RANGE FINDING METHOD IS RECORDED

CROSS-REFERENCE TO RELATED APPLICATIONS

This application is based upon and claims the benefit of priority from prior Japanese Patent Application No. 2004-054860, filed Feb. 27, 2004, the entire contents of which are incorporated herein by reference.

BACKGROUND OF THE INVENTION

1. Field of the Invention

The present invention relates to a projector that projects an arbitrary image on a screen, and in particular, to a projector comprising an automatic vertical and horizontal keystone correction function for a projected image which is based on a phase difference sensor system, a range finding method used for the projector, and a recording medium on which the range finding method is recorded.

2. Description of the Related Art

With a projector that projects an arbitrary image on a screen, a range finding pattern image is normally used to measure the distance from the projector to the screen. A point at which the contrast of the pattern image changes (normally a white part) is set as a measurement point. A phase difference sensor senses phase differences of reflected lights reflected from the measurement point to calculate the distance (see, for example, Jpn. Pat. Appln. KOKAI Publication No. 2003-204495).

There are at least three measurement points in the pattern image. Range finding is executed on these measurement points to detect the slope angle of a projection surface of the screen. Then, the distortion of an image projected on the screen corresponding to the slope angle is corrected.

The correction of distortion of the projected image is called "keystone correction" because the distortion is shaped like a keystone.

The range finding pattern image is dedicated for range finding. The range finding pattern image is typically composed of a simple light-dark pattern such as a black-and-white mark pattern which can be easily sensed by the phase difference sensor. Thus, the pattern image does not appear attractive when projected on the screen. Further, the pattern image itself does not convey any message. Accordingly, the pattern image remains a nuisance for a user watching the projected image until the range finding is finished.

BRIEF SUMMARY OF THE INVENTION

According to an aspect of the present invention there is provided a projector comprising a storage section which stores a chart image having a range finding light-dark pattern expressing a particular shape to be used as an advertisement, a projecting section which reads the chart image stored in the storage section and projects the image on a screen, and a range finding section which measures distances to a plurality of measurement points by sensing the light-dark patterns projected by the projecting section on an image projected surface.

According to further aspect of the present invention there is provided a projector comprising a storage section which stores a plurality of chart images having respective range-finding light-dark patterns expressing particular shapes which are temporally associated with one another, a projecting section which reads, in a predetermined order, the chart images stored in the storage section and projects the chart images on a screen, a range finding section which measures distances to a plurality of measurement points by sensing the light-dark patterns projected by the projecting section on an image projected surface, and a chart projection control section which controllably switches the chart image projected by the projecting section on the screen so that the amount of time left before the range finding is finished can be visually determined from the light-dark pattern projected on the image projected surface.

BRIEF DESCRIPTION OF THE SEVERAL VIEWS OF THE DRAWING

FIG. 9 is a flowchart showing the contents of subroutines of an AFK process executed by the projector according to the first embodiment;

FIG. 11 is a flowchart showing a chart creating process executed by the projector according to the second embodiment;

FIGS. 12A to 12F show inclusively diagrams illustrating chart images according to a third embodiment of the present invention and showing how range finding is carried out using chart images expressing numbers;

FIGS. 15A to 15F show inclusively diagrams illustrating another chart images according to the third embodiment and showing how range finding is carried out using chart images expressing marks.

DETAILED DESCRIPTION OF THE INVENTION

Embodiments of the present invention will be described below with reference to the drawings.

First Embodiment

Figure 1A:
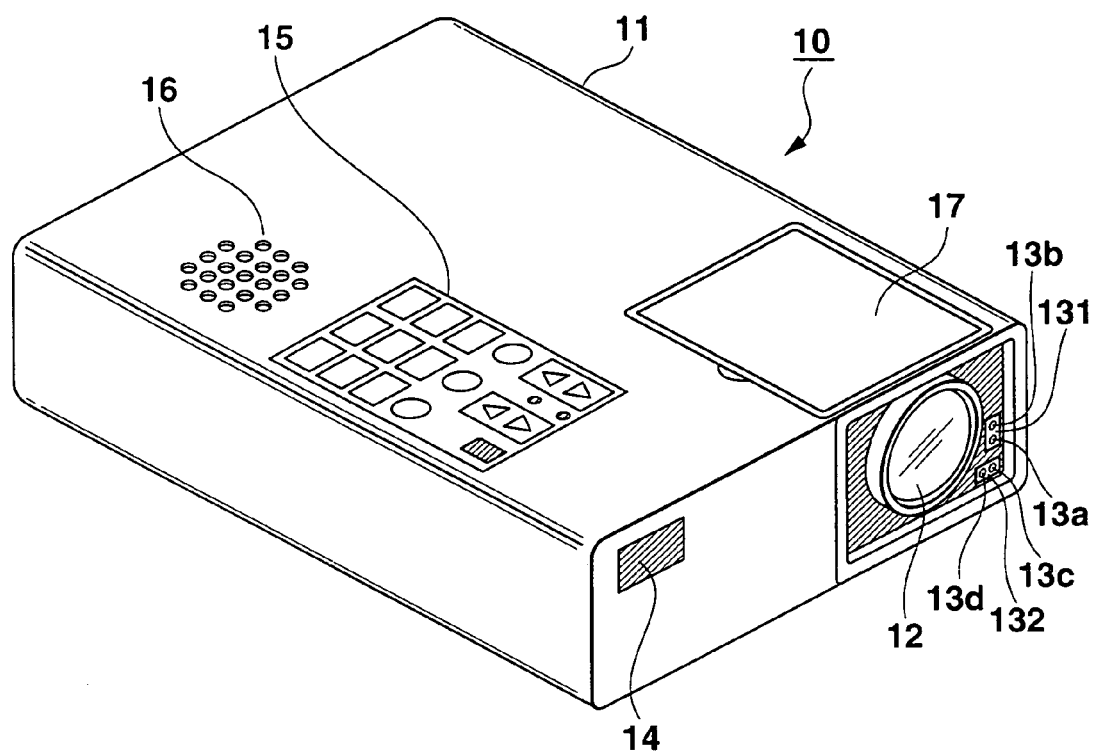
FIG. 1A is an upper perspective view showing the external appearance of a small-sized projector as an example of a projector according to a first embodiment of the present invention.
Figure 1B:
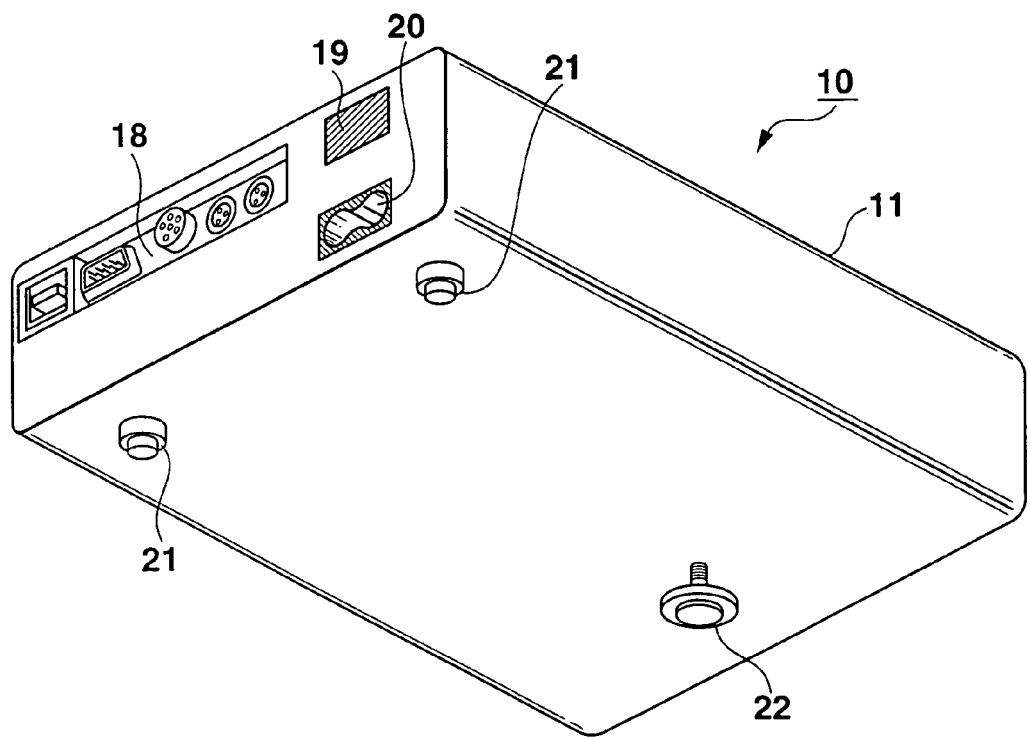
FIG. 1B is a lower perspective view showing the external appearance of a small-sized projector as an example of a projector according to a first embodiment of the present invention.

FIGS. 1A and 1B are diagrams showing upper and lower perspective appearances of a small-sized projector as an example of a projector according to a first embodiment of the present invention. FIG. 1A is a perspective view of the projector as viewed from above. FIG. 1B is a perspective view of the projector as viewed from below.

As shown in FIG. 1A, the projector 10 has a projection lens 12, two phase difference sensors 131 and 132, and a receiving section 14 all of which are provided in a front surface of a main body casing 11 shaped like a rectangular parallelepiped.

The projection lens 12 projects an optical image formed by a spatial optical modulating element such as a micro mirror element that will be described later. In this case, the projection lens 12 can arbitrarily vary a focus position and a zoom position (a projection angle of view).

Each of the phase difference sensors 131 and 132 uses parallax with respect to an object image to measure the distance to an object, specifically the distance to an image projected surface on the basis of the principle of triangle range finding. Specifically, the distance to the object in a vertical direction is measurement using range finding lenses 13a and 13b of the phase difference sensor 131 which are arranged in the vertical direction. The distance to the object in a horizontal direction is measurement using range finding lenses 13c and 13d of the phase difference sensor 132 which are arranged in the horizontal direction.

An Ir receiving section 14 receives infrared light on which a key operation signal from a remote controller (not shown) of the projector 10 is superimposed.

Further, a main body main key/indicator 15, a speaker 16, and a cover 17 are disposed on a top surface of the main body casing 11. The main body key/indicator 15 will be described later in detail. The speaker 16 outputs sounds when for example, motion pictures are reproduced. The cover 17 is opened and closed when sub-keys (not shown) are operated. The sub-keys controls various detailed operations that cannot be set or specified using the keys of the main body main key/indicator 15, without using the remote controller (not shown) of the projector 10.

Moreover, as shown in FIG. 1B, an I/O connector section 18, an Ir receiving section 19, and an AC adapter connecting section 20 are disposed on a rear surface of the main body casing 11.

The I/O connector section 18 comprises, for example, a USB terminal, a mini D-SUB terminal, an S terminal, and an RCA terminal through which videos are input, and a stereo mini terminal through which sounds are input.

Like the Ir receiving section 14, the Ir receiving section 19 receives infrared light on which a key operation signal from the remote controller (not shown) of the projector 10 is superimposed. The AC adapter connecting section 20 is used to connect a cable from an AC adapter (not shown) serving as a power source.

Further, a pair of fixed legs 21, 21 are attached to a back surface of the main body casing 11 closer to its bottom surface. An adjustment leg 22 that enables height to be adjusted is attached to the back surface of the main body casing 11 closer to its front surface. The adjustment leg 22 has its screw rotating position manually operated to adjust, strictly speaking, a vertical component of a projecting direction of the projection lens 12, that is, an angle of elevation.

Figure 2:
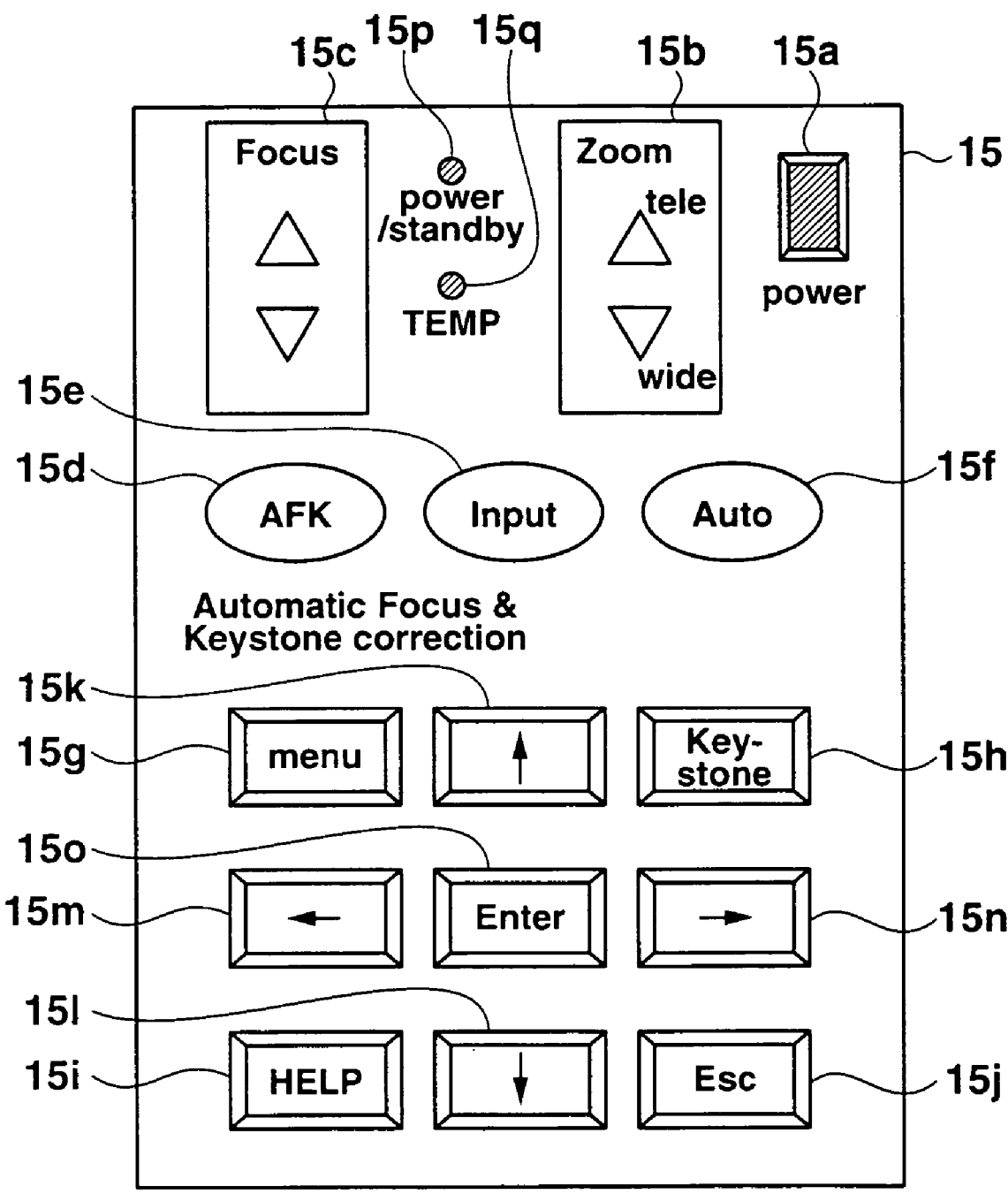
FIG. 2 is a diagram showing the arrangement of a main key/indicator provided on the main body of the projector according to the first embodiment.

FIG. 2 is a diagram showing the arrangement of the main body main key/indicator 15 in detail.

The main body main key/indicator 15 comprises a power key 15a, a zoom key 15b, a focus key 15c, an "AFK" key 15d, an "Input" key 15e, an "Auto" key 15f, a "menu" key 15g, a "Keystone" key 15h, a "HELP" key 15i, an "Esc" key 15j, an "up (↑)" key 15k, a "down (↓)" key 15l, a "left (←)" key 15m, a "right (→)" key 15n, and an "Enter" key 15o, as well as a power/standby indicator 15p, and a TEMP indicator 15q.

The power key 15a is used to instruct the power source to be turned on or off.

The zoom key 15b is used to instruct a zoom-up (tele) or zoom-down (wide) operation to be performed when "Δ" or "∇", respectively, is operated.

The focus key 15c is used to instruct a focus position to be moved forward or backward when "Δ" or "∇", respectively, is operated.

The focus key 15d is used to instruct automatic focusing and automatic keystone correction to be immediately performed.

The "Input" key 15e is used to instruct an image signal input to any portion of the I/O connector section 18 to be manually switched. The "Auto" key 15f is used to instruct the image signal input to any portion of the I/O connector section 18 to be automatically switched.

The "menu" key 15g is used to instruct any of various menu items for a projecting operation to be displayed. The "Keystone" key 15h is used to instruct the keystone correction to be manually manipulated.

The "HELP" key 15i is used to instruct various pieces of help information if how to give an instruction or to perform an operation is unknown. The "Esc" key 15j is used to instruct the current operation to be canceled.

The "up" key 15k, the "down" key 15l, the "left" key 15m, and the "right" key 15n are operated to make the current choice or specify the current moving direction for a menu item, a manual keystone correcting direction, a pointer, a cursor, or the like.

The power/standby indicator 15p indicates that the power source is on or off or that no image signal has been input, by for example, lighting, extinguishing, or blinking a green or red LED.

The TEMP indicator 15q, for example, lights, extinguishes, or blinks a green or red LED to indicate whether or not the temperature of a lamp serving as a light source for image projection is suitable for projection.

Figure 3:
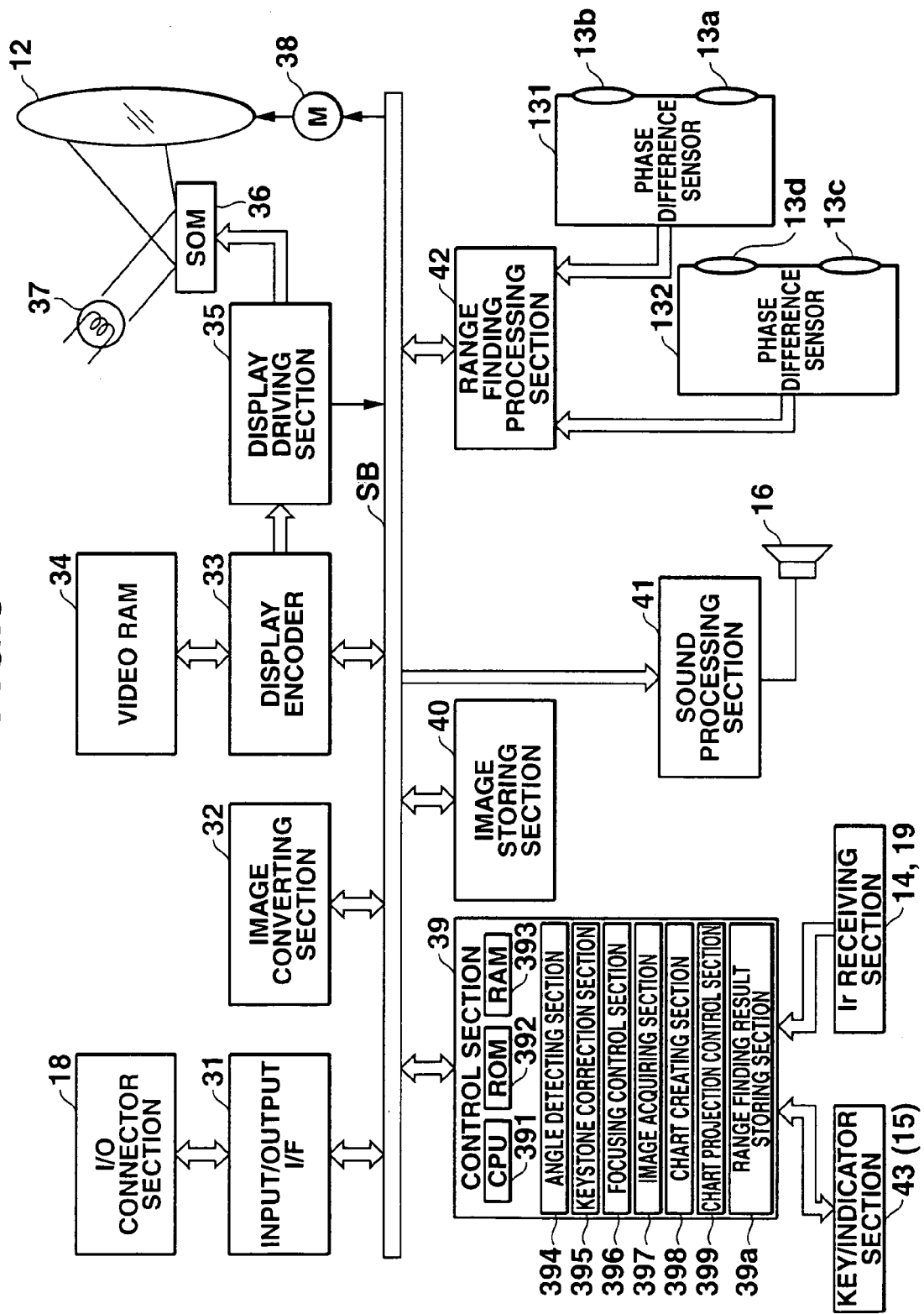
FIG. 3 is a block diagram showing the functional configuration of an electronic circuit of the projector according to the first embodiment.

FIG. 3 is a block diagram showing the functional configuration of an electronic circuit of the projector 10. In the figure, an image signal conforming to any of various standards is input through the I/O connector section 18. After passing through an I/O interface (I/F) 31 and a system bus SB, the image signal is converted by an image converting section 32 into a predetermined format. The image signal is then sent to a display encoder 33.

The display encoder 33 decompresses the image signal sent from the image converting section 32 and the decompressed image signal is stored in a video RAM 34. The display encoder 33 then generates a video signal on the basis of the contents stored in the video RAM 34 and outputs the video signal to a display driving section 35.

The display driving section 35 drives display by a spatial optical modulating element (SOM) 36 using an appropriate frame rate corresponding to the image signal, for example, 30 [frames/second]. The spatial optical modulating element 36 is irradiated with high-luminance white light emitted by a light source lamp 37 such as an ultrahigh voltage mercury lamp. Then, reflected light from the spatial optical modulating element 36 forms an optical image. The optical image is then projected and displayed on a screen, not shown in FIG. 3, via the projection lens 12. The projection lens 12 is driven by a lens motor (M) 38 to move appropriately a zoom position and a focus position. A projecting section is constituted by the projection lens 12, the spatial optical modulating element (SOM) 36, the light source lamp 37, and the lens motor (M) 38.

A control section 39 controls all the operations of the above circuits and elements. The control section 39 is composed of a microcomputer which comprises a CPU 391, a ROM 392 that fixedly stores operation programs to be executed by the CPU 391. The operation programs includes an automatic focusing program and automatic keystone correction program which will be described later. The microcomputer further includes a RAM 393 used as a work memory, an angle detecting section 394 that detects the slope angle of the image projected surface on the basis of range finding data, a keystone correcting section 395 that executes keystone correction on a projected image, a focusing control section 396 that carries out automatic focusing, an image acquiring section 397 that acquires arbitrary image data, a chart creating section 398 that creates chart images, a chart control section 399 that switches a chart image projected, and a range finding result storing section 39a that stores the results of measurements.

Further, to the control section 39 are connected an image storing section 40, a sound processing section 41, and a range finding processing section 42 via the system bus SB.

The image storing section 40 (storage section) includes, for example, a flash memory to store image data such as chart images (a horizontal and vertical chart images) and a user logo image. The image storing section 40 appropriately outputs image data specified by the control section 39 and then transmits the image data to the display encoder 33. The projection lens 12 then projects and displays those images.

The sound processing section 41 comprises a sound source circuit such as a PCM sound source. The sound processing section 41 converts sound data provided during a projecting and displaying operation, into analog data. The sound processing section 41 then drives the speaker 16 to generate sounds.

The range finding processing section 42 or range finding section drives the phase difference sensor 131, having the range finding lenses 13a and 13b, and the phase difference sensor 132, having the range finding lenses 13c and 13d. The range finding processing section 42 thus measures the distance to an arbitrary point in a chart image projected and displayed as described later.

A key/indicator section 43 is constituted by the main body main key/indicator 15 and the main body sub-keys, provided in the cover 17. A key operation signal from the key/indicator section 43 is input directly to the control section 39. Further, the control section 39 directly drives the power/standby indicator 15p and TEMP indicator 15q to let these indicators generate lights or blinks. On the other hand, infrared light signals generated by the Ir receiving section 14 and Ir receiving section 19 are input directly to the control section 39.

Now, before describing operations of the present embodiment, description will be given, with reference to FIGS. 4 to 6, of a method of detecting an angle on the basis of a phase difference sensor system which method is used for the projector 10. In this case, of the two phase difference sensors 131 and 132 provided in the projector 10, the phase difference sensor 132 for horizontal range finding will be described by way of example. However, the description also applies to the phase difference sensor 131 for vertical range finding.

First, the principle of triangular range finding will be described.

Figure 4:
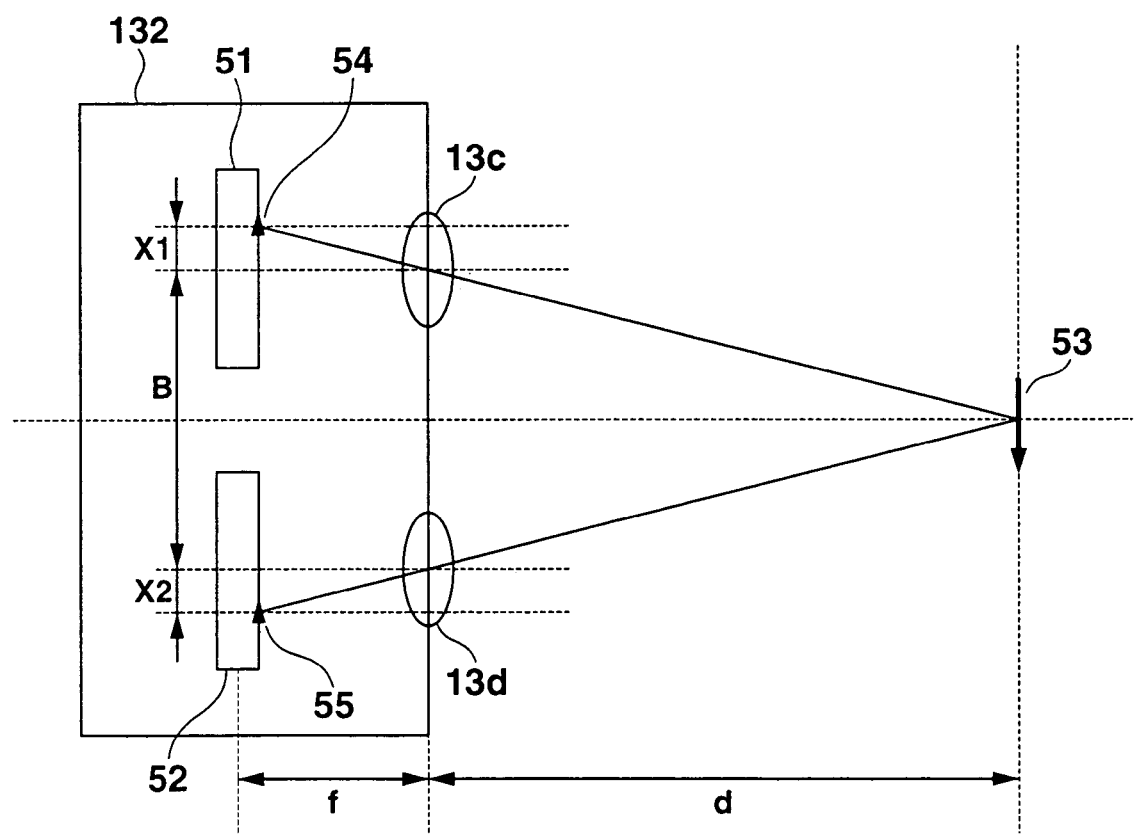
FIG. 4 is a diagram illustrating the principle of triangular range finding.

FIG. 4 is a diagram illustrating the principle and showing the phase difference sensor 132 for horizontal range finding as viewed from above. The phase difference sensor 132 is composed of the pair of range finding lenses 13c and 13d and a pair of photosensor arrays 51 and 52 disposed opposite the range finding lenses 13c and 13d.

The distance from the photosensor 132 to an object 53 is to be measured. The object 53 is irradiated with light and the resulting reflected light is formed into an image on the photosensor array 51 through one 13c of the range finding lenses. The reflected light is also formed into an image on the photosensor array 52 through the other range finding lens 13d. Reference numerals 54 and 55 in the figure denote the object images.

Here, the distances between the optical axes of the range finding lenses 13c and 13d and the respective images formed are defined as x1 and x2. The distance between the optical axes of the range finding lenses 13c and 13d is defined as B. The distance between the photosensor array 51 or 52 and the range finding lens 13c or 13d is defined as f. Then, the distance d from the lens 13c or 13d to the object 53 is determined as follows:

$$d = B \times f/(x1+x2)$$

In this equation, B and f are constants or values unique to the sensor 132. Consequently, the distance d between the sensor 132 and the object 53 is determined using the distances or phases (x1 and x2) on the photosensor arrays 51 and 52.

Now, multipoint range finding will be described.

Figure 5:
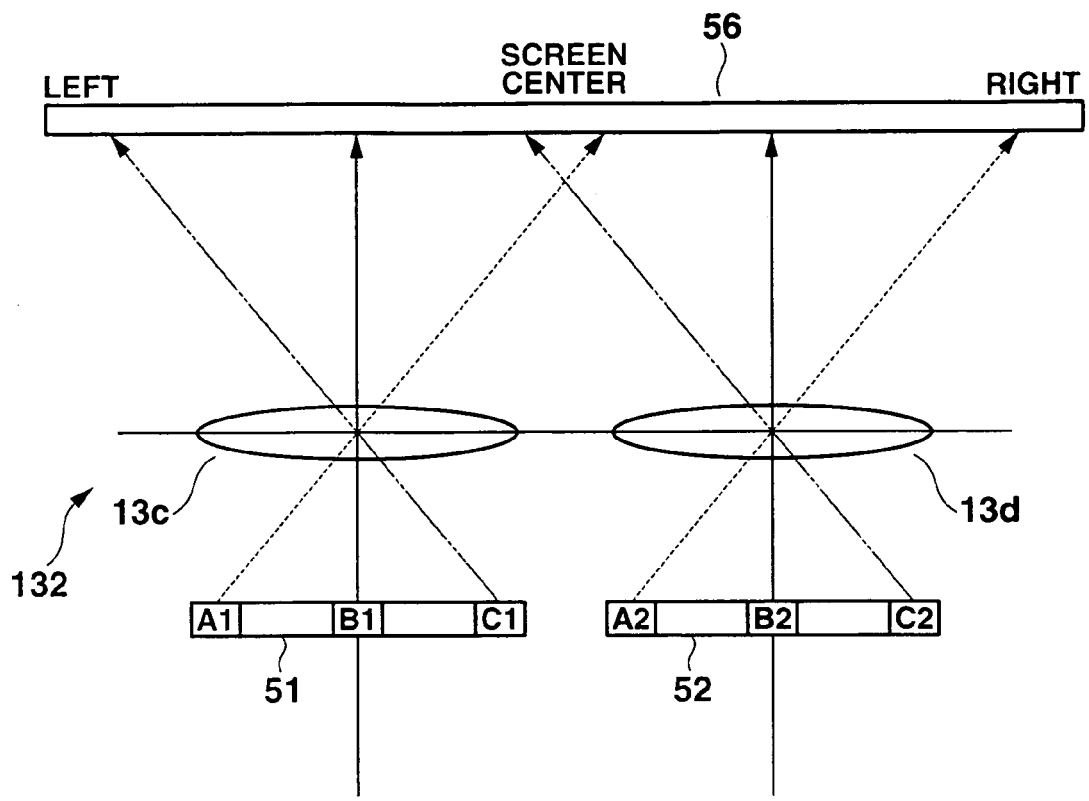
FIG. 5 is a diagram illustrating multipoint range finding.

FIG. 5 is a diagram illustrating the multipoint range finding. The pair of photosensor arrays 51 and 52, constituting the phase difference sensor 132, is composed of line sensors having several-hundred-bit photosensors arranged in a line. With the multipoint range finding, these photosensors are divided into a plurality of groups. Then, each of the groups carries out range finding.

In the example in FIG. 5, the photosensors included in each of the photosensor arrays 51 and 52 are divided into three groups. The photosensors in groups A1 and A2 are used to execute range finding on the right side of a screen 56. The photosensors in groups B1 and B2 are used to execute range finding on the vicinity of the center of the screen 56. The photosensors in groups C1 and C2 are used to execute range finding on the left side of the screen 56.

Figure 6:
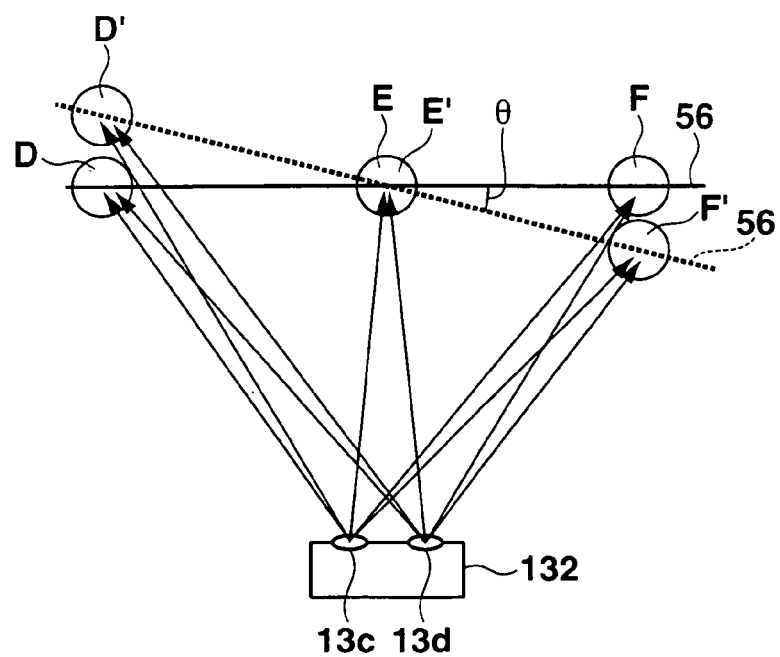
FIG. 6 is a diagram showing the positional relationship between a phase difference sensor and a screen.

FIG. 6 shows the positional relationship between the phase difference sensor 132 and the screen 56. If the phase difference sensor 132 and the screen 56 are parallel, when range finding is executed on three measurement points on the right side, in the center, and on the left side of the screen 56 (these points are defined as D, E, and F, respectively), the phase (or distance) difference relationship is D=E=F.

On the other hand, if the screen 56 is tilted through an angle θ as shown by a broken line in the figure, when range finding is executed on three measurement points on the right side, in the center, and on the left side of the screen 56 (these points are defined as D', E', and F', respectively), the phase difference relationship is D'<E'<F'. In this case, since the screen 56 is a plane, the three points can be represented as a straight line like a linear function. It is then possible to determine the slope angle of the screen 56, that is, the slope angle of an image projected on the screen 56, on the basis of the distances to the three points.

If range finding such as that described above is carried out, a chart image consisting of black-and-white pattern images is used so that the phase difference sensors 131 and 132 can sense the points to be measured. Such chart images have been dedicated for range finding and do not convey any message. Therefore, they have been trivial.

Thus, the present embodiment is characterized in that a chart image also used as, for example, a company logo for advertisement is created and then projected and displayed for range finding and that in the meantime, the pattern shape of the chart image is utilized for advertisement.

Figure 7A:
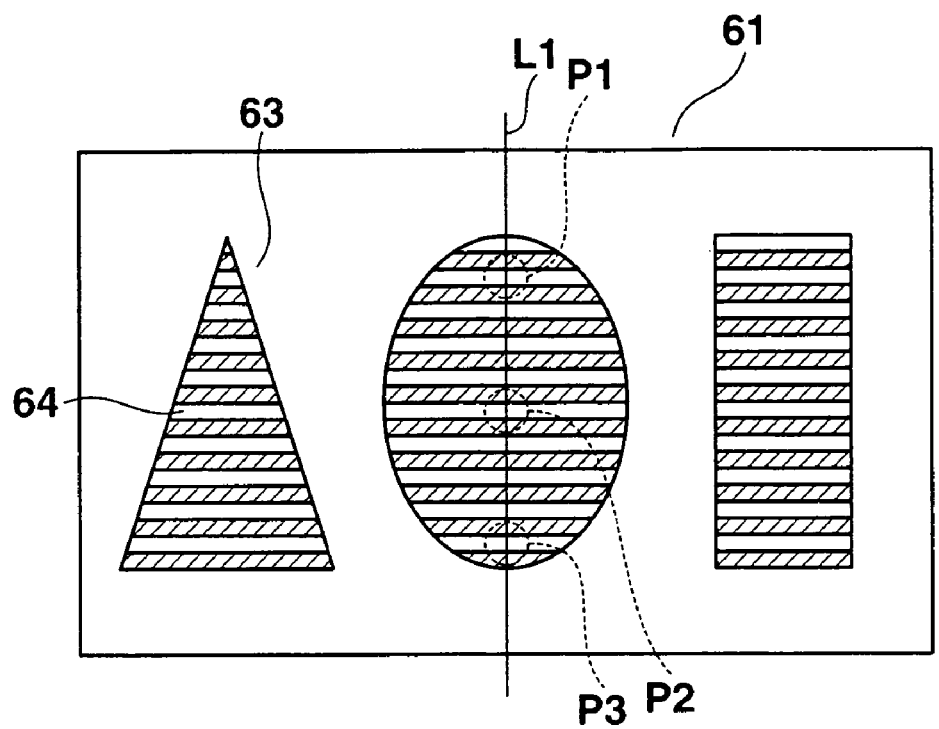
FIG. 7A is a diagram showing an example of a vertical chart image used for vertical range finding.
Figure 7B:
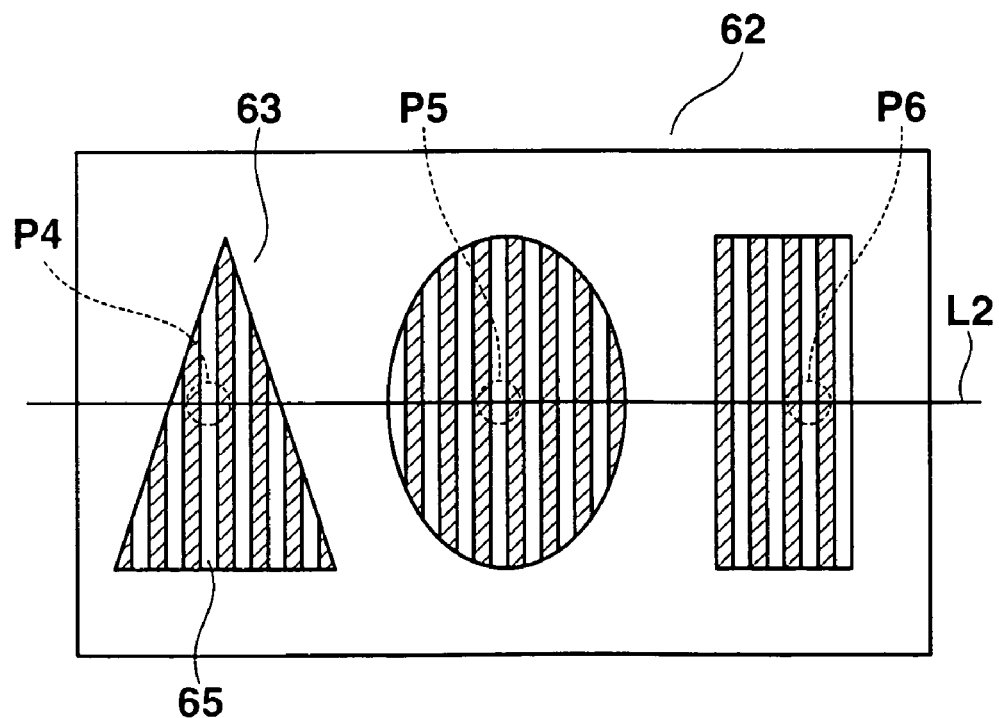
FIG. 7B is a diagram showing an example of a horizontal chart image used for horizontal range finding.

FIGS. 7A and 7B show specific examples.

FIGS. 7A and 7B are diagrams showing respectively examples of vertical and horizontal chart images according to a first embodiment of the present invention. Thus, FIG. 7A shows an example of a vertical chart image 61 used for vertical range finding and FIG. 7B shows an example of a horizontal chart image 62 used for horizontal range finding. The chart images 61 and 62 are assumed to be a company logo 63.

As shown in FIG. 7A, the vertical chart image 61 has a black-and-white or light-dark pattern 64 expressing the shape of the company logo 63. The light-dark pattern 64 includes light patterns and dark patterns arranged alternately in the vertical direction of the image.

If this vertical chart image 61 is used for range finding, a difference in the contrast of the light-dark pattern 64 is read using a vertical scan line L1 by the phase difference sensor 131, installed in the vertical direction. The distances to three measurement points P1, P2, and P3 (bright points) on the vertical scan line L1 are thus measured.

Further, as shown in FIG. 7B, the horizontal chart image 62 is obtained by changing the orientation of the pattern of the vertical chart image 61. The horizontal chart image 62 has a black-and-white or light-dark pattern 65 expressing the shape of the company logo 63. The light-dark pattern 65 includes light patterns and dark patterns arranged alternately in the horizontal direction of the image 62.

If this horizontal chart image 62 is used for range finding, a difference in the contrast of the light-dark pattern 65 is read using a horizontal scan line L2 from the phase difference sensor 132, installed in the horizontal direction. The distances between the sensor 132 and three measurement points P4, P5, and P6 (bright points) on the horizontal scan line L2 are thus measured.

The vertical chart image 61 and the horizontal chart image 62 are stored and held in the image storing section 40 shown in FIG. 3. When range finding is to be carried out, these chart images 61 and 62 are selectively read from the image storing section 40 and are then projected and displayed.

Operations of the first embodiment will be described below in detail.

Figure 8:
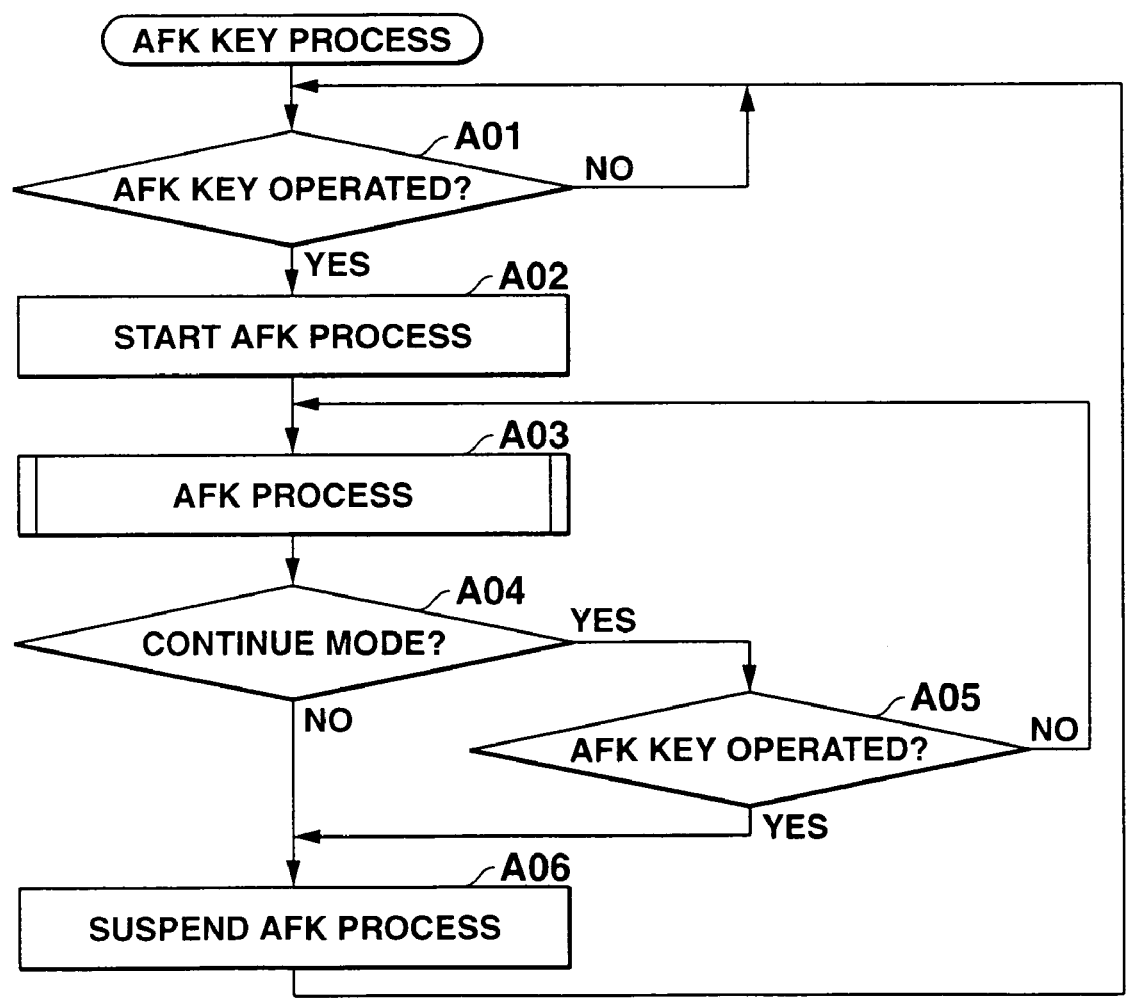
FIG. 8 is a flowchart showing the contents of a process executed when an AFK key of the projector according to the first embodiment is operated.

FIG. 8 shows the contents of automatic focusing and automatic keystone correction forcibly executed as an interrupting process by operating the "AFK" key 15d of the main body main key/indicator 15 when the power source is turned on. In this case, the control section 39 performs relevant control on the basis of the operation programs stored in the internal ROM 392.

In this case, it is assumed that a user operates the "menu" key 15g, "up" key 15k, "down" key 151, "Enter" key 15o, and any other keys of the main body main key/indicator 15 to preset either a one-shot mode or a continue mode. In the one-shot mode, a process of automatic focusing and automatic keystone correction is executed only once in response to an operation of the "AFK" key 15d. In the continue mode, the process of automatic focusing and automatic keystone correction is repeatedly and continuously executed after the first operation of the "AFK" key 15d until the second operation of the same key.

At the beginning of the process, the control section waits for the "AFK" key 15d to be operated (step A01). Upon determining that the "AFK" key 15d has been operated, the control section suspends the current operation and sets a state in which automatic focusing and automatic keystone correction are to be started as an interrupting process (step A02). The automatic focusing and automatic keystone correction are carried out for the first time (step A03).

FIG. 9 shows the contents of subroutines of the process of automatic focusing and automatic keystone correction. At the beginning, a projecting system including the projection lens 12 projects and displays a vertical chart image 61 such as the one shown in FIG. 7A, on the screen on the basis of the image data stored in the image storing section 40 (steps B01 and B02). The vertical chart image 61 has the range-finding light-dark pattern 64, which expresses the shape of the company logo 63.

With this vertical chart image 61 projected and displayed, the phase difference sensor 131 for vertical range finding is first driven to sequentially read the three measurement points P1, P2, and P3 (bright points), which are present on the vertical scan line L1 (step B03). Thus, the distances to the projected image positions at the measurement points P1, P2, and P3 are sequentially measured (step B04).

The order in which the measurement points P1, P2, and P3 undergo range finding is not particularly limited. For example, the measurement point P2, a central point, may undergo range finding first. Then, the measurement point P1, an upper point in the screen, may undergo range finding. Finally, the measurement point P3, a lower point in the screen, may undergo range finding.

In this case, vertical range finding is carried out first by projecting the vertical chart image 61. However, horizontal range finding may be carried out first by projecting the horizontal chart image 62. The resulting distance data on the measurement points P1, P2, and P3 are stored and held in the range finding result storing section 39a, provided in the control section 39.

After the measurement points P1, P2, and P3 have undergone range finding, the vertical angle "θv" of the screen projection surface from a projecting optical axis is calculated on the basis of the distance data on the measurement points P1, P2, and P3 stored in the range finding result storing section 39a (step B05).

Then, instead of the vertical chart image 61, a horizontal chart image 62 such as the one shown in FIG. 7B is read from the image storing section 40 and is then projected and displayed (steps B06 and B07). The horizontal chart image 62 has the range-finding light-dark pattern 65, which also expresses the shape of the company logo 63.

With this horizontal chart image 62 projected and displayed, the phase difference sensor 132 for horizontal range finding is driven to sequentially read the three measurement points P4, P5, and P6 (bright points), which are present on the horizontal scan line L2 (step B08). Thus, the distances to the projected image positions at the measurement points P4, P5, and P6 are sequentially measured (step B09).

The order in which the measurement points P4, P5, and P6 undergo range finding is not particularly limited. For example, the measurement point P5, a central point, may undergo range finding first. Then, the measurement point P4, a left-hand point in the screen, may undergo range finding. Finally, the measurement point P6, a right-hand point in the screen, may undergo range finding. The resulting distance data on the measurement points P4, P5, and P6 are stored and held in the range finding result storing section 39a, provided in the control section 39.

After the measurement points P4, P5, and P6 have undergone range finding, the horizontal angle "θh" of the screen projection surface from the projecting optical axis is calculated on the basis of the distance data on the measurement points P4, P5, and P6 stored in the range finding result storing section 39a (step B10).

Then, the distance to the projected image position at the measurement point P2 or P5, located in the center, is determined to be a distance value representative of the projected image; the distance is measured in step B04 or B09. The lens motor 38 is then used to move the projection lens 12 so that a focused position conforms to the distance value (step B11).

Subsequently, settings described below are made. The followings are determined on the basis of the vertical angle "θv" and horizontal angle "θh" of the screen projection surface on which the images obtained in steps B05 and B10 are projected: at what angle and in which direction the entire screen projection surface is inclined and how to form the projected image into a rectangle with the same appropriate aspect ratio as that of the image signal input. Required keystone correction angles are thus determined. The display encoder 33 is caused to correct the upper, lower, right, and left sides of the image data decompressed and stored in the video RAM 34 (step B12). The control section 39 then ends the series of subroutines in FIG. 9 and return to the processing shown in FIG. 8.

In FIG. 8, after carrying out automatic focusing and automatic keystone correction in step A03, the control section 39 determines whether or not the continue mode is currently set (step A04).

If the control section 39 determines that the continue mode is set, it confirms that the second operation of the "AFK" key 15d has not been performed (step A05). If No, the control section 39 returns to step A03 to carry out automatic focusing and automatic keystone correction.

Thus, if the continue mode is set, the process of automatic focusing and automatic keystone correction is continuously executed by repeating steps A03 to A05 until the "AFK" key 15d is operated for the second time.

If the control section 39 determines in step A05 that the second operation of the "AFK" key 15d has been performed and in step A04 that the one-shot mode has been set instead of the continue mode, then the control section 39 sets a state in which the automatic focusing and automatic keystone correction, or the interrupting process, are immediately ended (step A06). The control section 39 thus returns to the preceding operation and to step A01 in preparation for the next operation of the "AFK" key 15d.

Thus, when the user operates the "AFK" key 15d of the main body main key/indicator 15, the distances to the plurality of measurement points corresponding to the vertical and horizontal directions of the image projected surface are measured in response to the key operation. Then, the automatic focusing and automatic keystone correction of the projected image are simultaneously carried out on the basis of the results of the measurements. Therefore, a single key instruction or operation enables the focused position and keystone distortion of the projected image to be automatically adjusted easily and promptly.

Further, for range finding, by projecting and displaying chart images 61 and 62 imitating a company logo 63 such as those shown in FIGS. 7A and 7B, it is possible to utilize the pattern shapes of the chart images 61 and 62 projected and displayed on the screen to advertise the company logo 63 until the range finding is finished.

In this embodiment, the company logo is used by way of example. However, with any particular shape such as a commodity logo or a message character which can also be used as an advertisement, by imitating it using the pattern shape of a chart image, it is possible to effectively utilize a wait time before the range finding is finished to provide the user with various pieces of information.

Second Embodiment

Now, a second embodiment of the present invention will be described. The external configuration of the apparatus and the configurations of its circuits are similar to those of the first embodiment. Accordingly, description will be given of processes different from those of the first embodiment.

In the first embodiment, chart images having a particular pattern such as a company logo are provided. However, the second embodiment is characterized in that chart images having a range-finding light-dark pattern can be created from arbitrary image data and that the chart images created are projected and displayed for range finding.

Figure 10A:
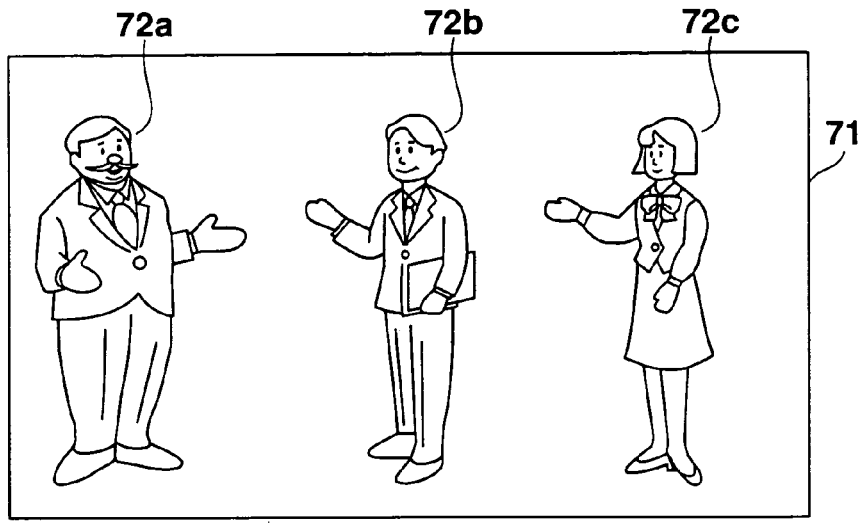
FIG. 10A is a diagram showing an example of an image from which charts are to be created.
Figure 10B:
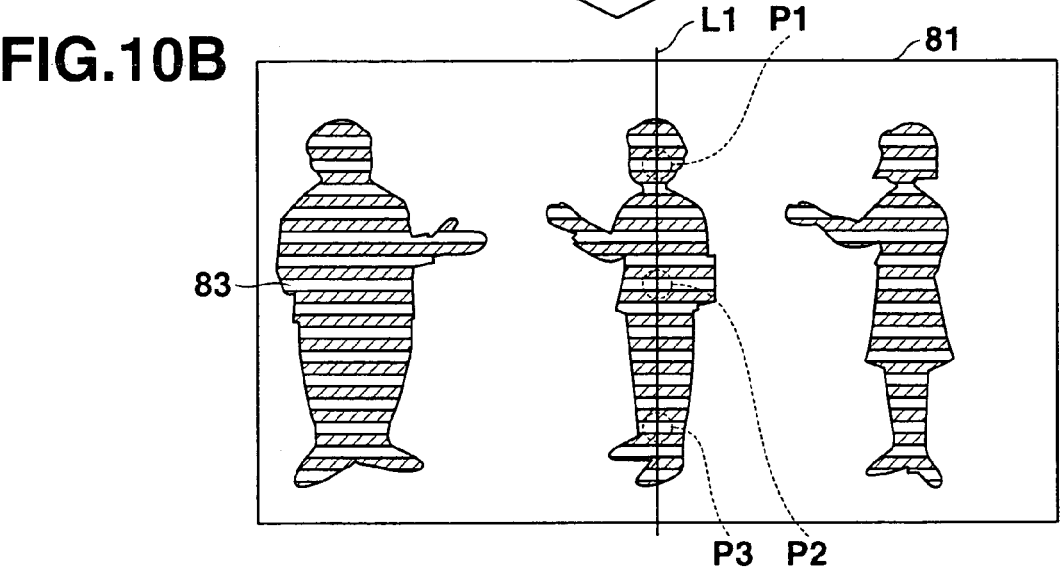
FIG. 10B is a diagram showing an example of a vertical chart image created from the chart creation object image.
Figure 10C:
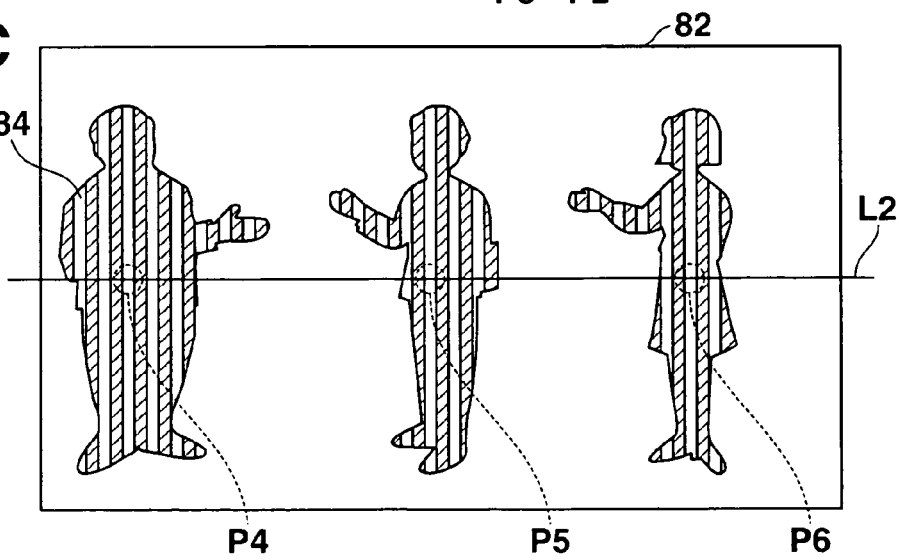
FIG. 10C is a diagram showing an example of a horizontal chart image created from the chart creation object image.

FIGS. 10A to 10C show inclusively a specific example.

FIGS. 10A to 10C are diagrams illustrating chart images according to the second embodiment of the present invention. FIG. 10A is a diagram showing an example of a chart creation object image 71. FIG. 10B is a diagram showing an example of a vertical chart image 81 for vertical range finding created on the basis of the chart creation object image 71. FIG. 10C is a diagram showing an example of a horizontal chart image 82 for horizontal range finding created on the basis of the chart creation object image 71.

Image data available as the chart creation object image 71 may be, for example, an image photographed using an image pickup device such as a digital camera or a read image using a scanner or the like. The image data is externally loaded via, for example, the I/O connector section 18 and is then stored and held in the image storing section 40.

The composition of the image data available as the chart creation object image 71 is not particularly limited. However, since a difference in contrast is sensed in the horizontal and vertical directions during range finding, the image data preferably has a certain composition in both horizontal and vertical directions.

In the example in FIG. 10A, persons 72a, 72b, and 72c are located in the left, center, and right of the image 71. A vertical chart image 81 such as the one shown in FIG. 10B and a vertical chart image 82 such as the one shown in FIG. 10C are created on the basis of the positions and shapes of the persons 72a, 72b, and 72c.

The vertical chart image 81 has a black-and-white or light-dark pattern 83 imitating the shapes of the persons 72a, 72b, and 72c. The light-dark pattern 83 includes light patterns and dark patterns alternately arranged in the vertical direction. If this vertical chart image 81 is used for range finding, a difference in the contrast of the light-dark pattern 83 is read using the vertical scan line L1 from the phase difference sensor 131, installed in the vertical direction. The distances to three measurement points P1, P2, and P3 (bright points) on the vertical scan line L1 are thus measured.

The horizontal chart image 82 is obtained by changing the orientation of the pattern of the vertical chart image 81. The horizontal chart image 82 has a black-and-white or light-dark pattern 84 imitating the shapes of the persons 72a, 72b, and 72c. The light-dark pattern 84 has light patterns and dark patterns arranged in the horizontal direction. If this horizontal chart image 82 is used for range finding, a difference in the contrast of the light-dark pattern 84 is read using the horizontal scan line L2 from the phase difference sensor 132, installed in the horizontal direction. The distances to three measurement points P4, P5, and P6 (bright points) on the horizontal scan line L2 are thus measured.

Process operations according to the second embodiment will be described below in detail.

FIG. 11 is a flowchart showing the operations of a chart creating process according to the second embodiment. The chart creating process is executed by the control section 39, a microprocessor, by loading the operation programs stored in the internal ROM 392 as in the case of the first embodiment.

First, arbitrary image data is acquired which can be used as a chart creation object image (step C01). In this case, for example, a list of various images including photograph images available as chart creation object images may be displayed so that the user can select any image data for creation of a chart. Then, the image data selected may be loaded and used as a chart creation object image.

The chart creation image 71 having the persons 72a, 72b, and 72c as shown in FIG. 10A will be considered by way of example. A vertical chart image 81 such as the one shown in FIG. 10B is created on the basis of the positions and shapes of the persons 72a, 72b, and 72c (step C02).

Specifically, a black-and-white or light-dark pattern 84 imitating the shapes of the persons 72a, 72b, and 72c is formed in the vertical direction by following the contours of the persons 72a, 72b, and 72c in the chart creation object image 71. The vertical chart image 81 thus created is stored and held in the image storing section 40 (step C03).

Similarly, a horizontal chart image 82 such as the one shown in FIG. 10C is created on the basis of the positions and shapes of the persons 72a, 72b, and 72c. The horizontal chart image 82 is then stored and held in the image storing section 40 together with the vertical chart image 81 (step C04).

If range finding is carried out using the vertical chart image 81 and horizontal chart image 82 thus created, the vertical chart image 81 is selectively read from the image storing section 40 and is then projected and displayed on the screen. Then, as shown in FIG. 10B, the phase difference sensor 131 is used to measure the distances to the measurement points P1, P2, and P3 (bright points).

Subsequently, the horizontal chart image 82 is selectively read from the image storing section 40 and is then projected and displayed on the screen. Then, as shown in FIG. 10C, the phase difference sensor 132 is used to measure the distances to the measurement points P4, P5, and P6 (bright points).

The specific operations of an AFK process (a focusing process and a keystone correction process) including a range finding process are similar to those in FIG. 9. Accordingly, the detailed description of these operations is omitted.

As described above, according to the second embodiment, it is possible to load and use arbitrary image data as a chart creation object image and to create a chart image having a range-finding light-dark pattern expressing a particular shape on the basis of the image data. Therefore, by creating unique chart images utilizing various image data such as ones photographed using an image pickup device, it is possible to select and enjoy any of the chart images which matches the atmosphere or situation in which the projector is positioned.

Further, by projecting and displaying such a chart image for range finding, it is possible to provide various pieces of information utilizing the shape of the image created until the range finding is finished.

Third Embodiment

Now, a third embodiment of the present invention will be described. The external configuration of the apparatus and the configurations of its circuits are similar to those of the first embodiment. Accordingly, description will be given of processes different from those of the first embodiment.

The third embodiment is characterized in that during a range finding period, the light-dark pattern of a chart image is changed on the basis of the amount of time before the range finding is finished so that the user can visually determine the remaining time from the changed pattern shape.

FIGS. 12A to 12F show inclusively a specific example.

FIGS. 12A to 12F are diagrams illustrating chart images according to a third embodiment of the present invention. Reference numerals 91 to 96 in the figures denote vertical and horizontal chart images created so as to express numbers. Specifically, the vertical chart image 91 and the horizontal chart image 92 express the number "3". The vertical chart image 93 and the horizontal chart image 94 express the number "2". The vertical chart image 95 and the horizontal chart image 96 express the number "1". As the time elapses, these images are sequentially switched and then projected and displayed on the screen.

In this case, the vertical chart image 91 has a vertical light-dark pattern 91a expressing the shape of the number "3". The horizontal chart image 92 has a horizontal light-dark pattern 92a expressing the shape of the number "3". The chart images 91 and 92 are sequentially displayed to indicate that the amount of time left before the range finding is finished is three seconds.

Further, the vertical chart image 93 has a vertical light-dark pattern 93a expressing the shape of the number "2". The horizontal chart image 94 has a horizontal light-dark pattern 94a expressing the shape of the number "2". The chart images 93 and 94 are sequentially displayed to indicate that the amount of time left before the range finding is finished is two seconds.

Furthermore, the vertical chart image 95 has a vertical light-dark pattern 95a expressing the shape of the number "1". The horizontal chart image 96 has a horizontal light-dark pattern 96a expressing the shape of the number "1". The chart images 95 and 96 are sequentially displayed to indicate that the amount of time left before the range finding is finished is one second.

Description will be given of process operations performed using the chart images 91 to 96 having the pattern shapes of the numbers.

Figure 13:
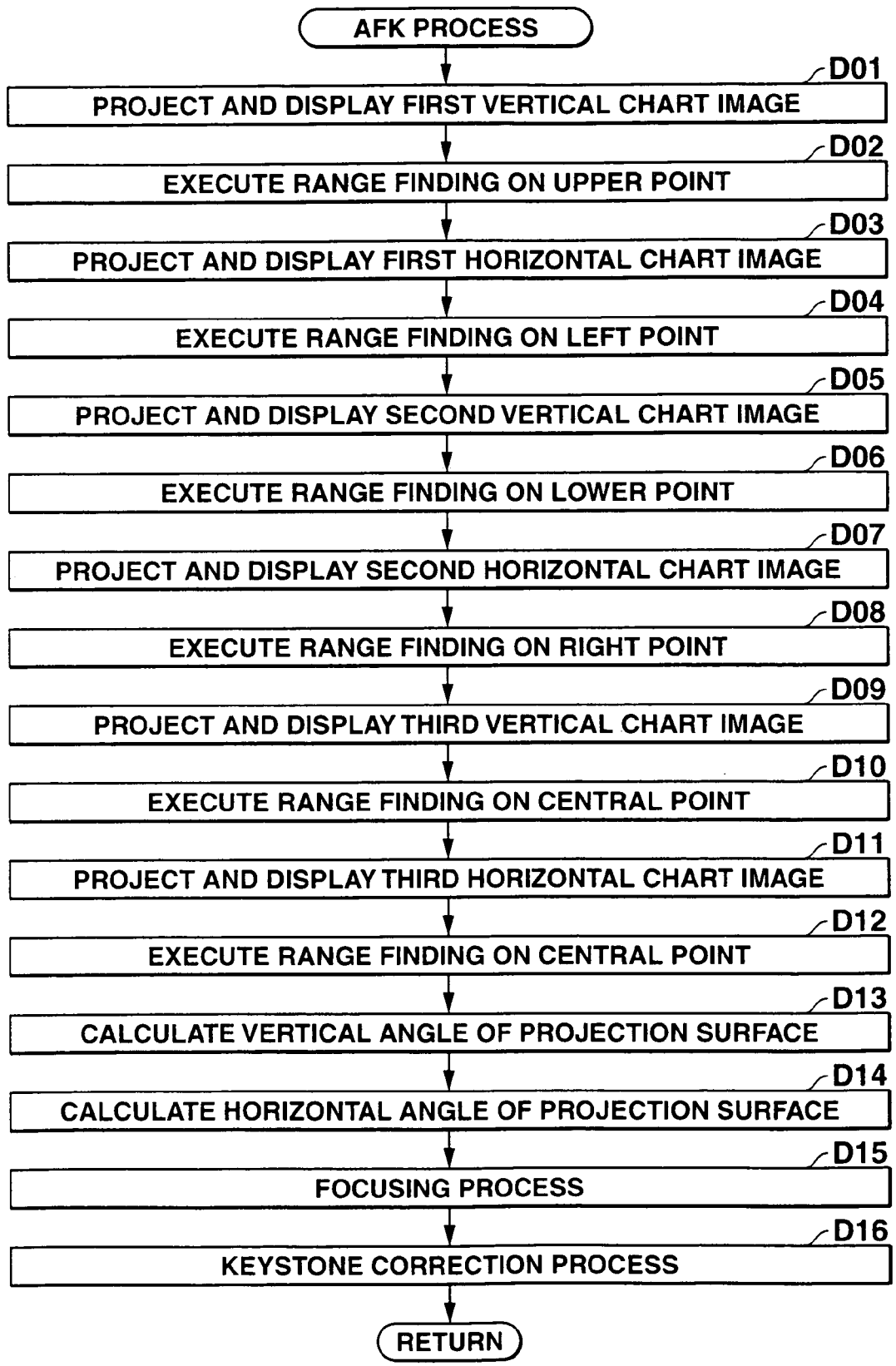
FIG. 13 is a flowchart showing the contents of subroutines of an AFK process executed by the projector according to the third embodiment.
Figure 14A:
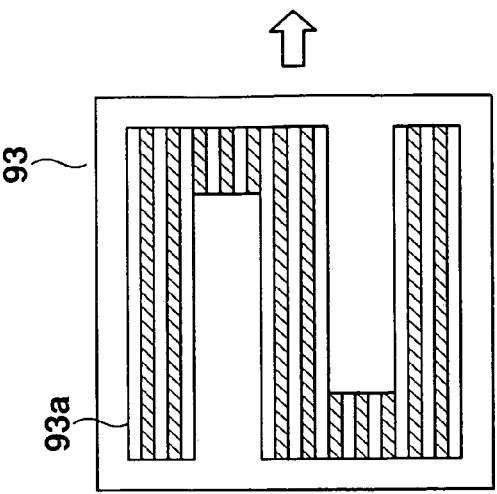
FIGS. 14A to 14F show inclusively diagrams illustrating chart images according to the third embodiment for showing another method by which range finding is carried out using chart images expressing numbers.
Figure 14B:
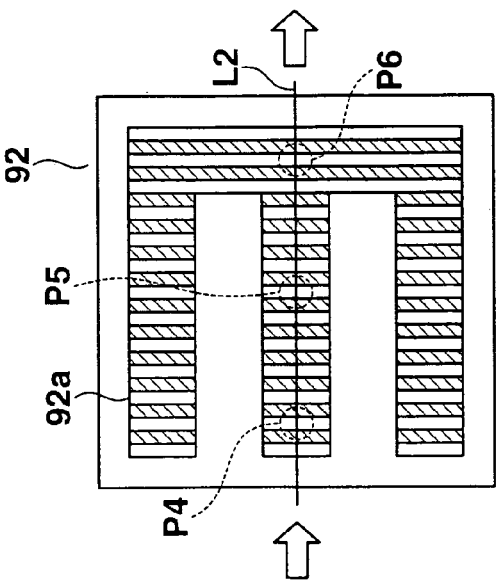
Figure 14C:
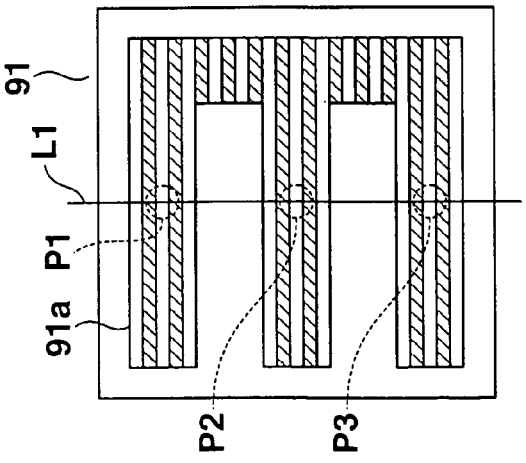
Figure 14D:
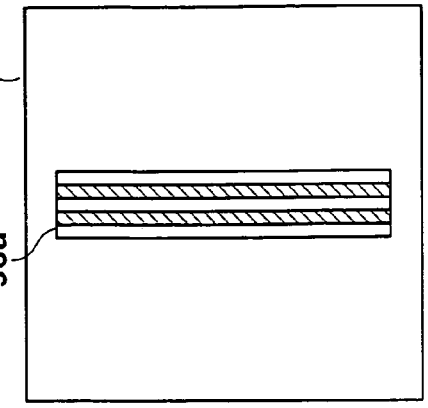
Figure 14E:
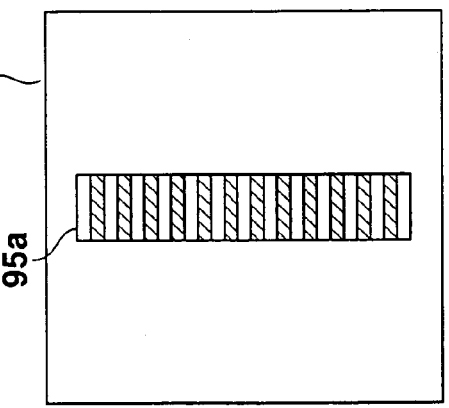
Figure 14F:
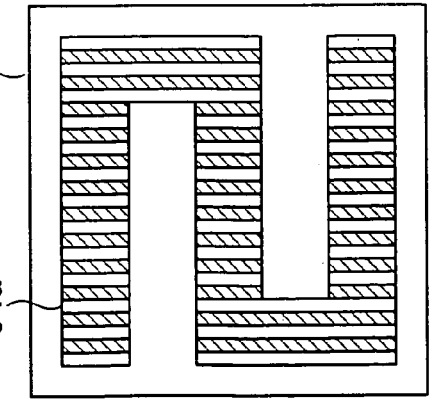
Figure 16A:
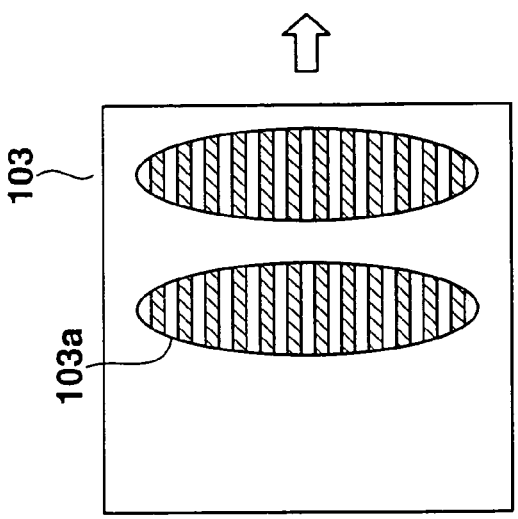
FIGS. 16A to 16F show inclusively diagrams illustrating another chart images according to the third embodiment and showing how range finding is carried out using chart images expressing marks.
Figure 16B:
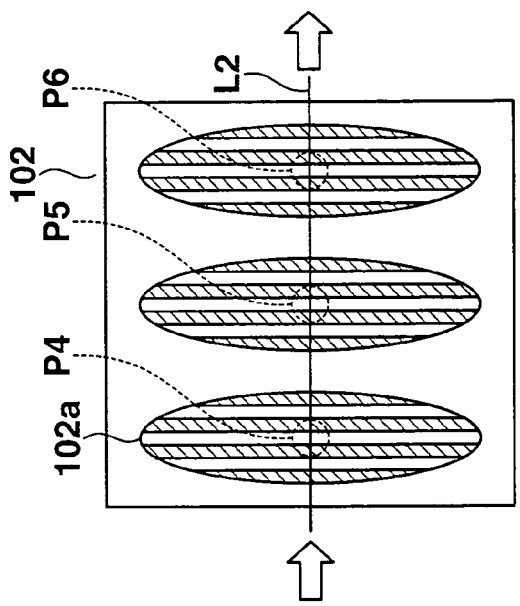
Figure 16C:
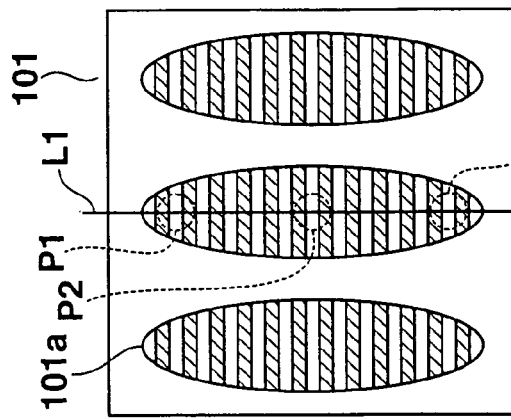
Figure 16D:
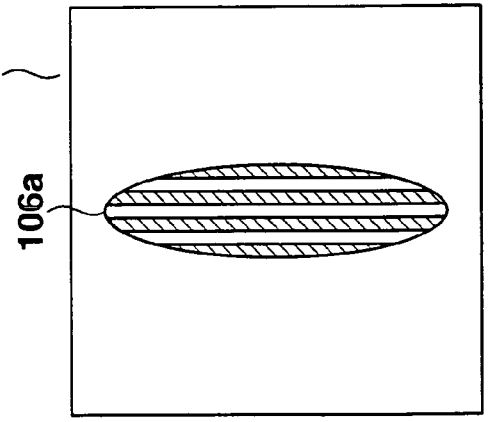
Figure 16E:
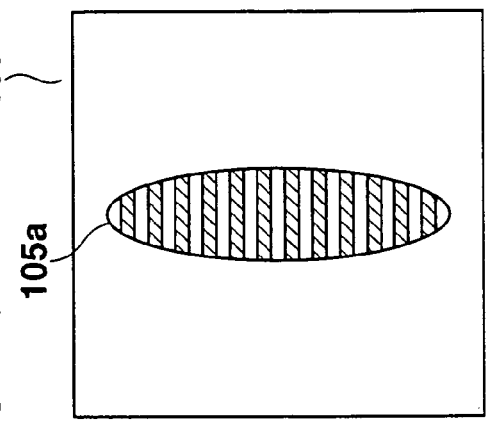
Figure 16F:
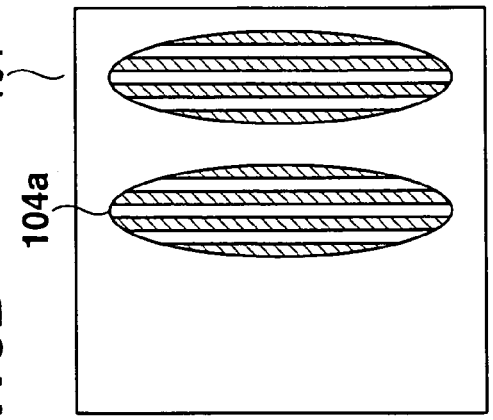

FIG. 13 is a flowchart showing operations of an AFK process according to the third embodiment. FIG. 13 corresponds to the process shown in FIG. 9 according to the first embodiment. This AFK process is also executed by the control section 39 or a microprocessor, by loading the operation programs stored in the internal ROM 392 as in the case of the first embodiment.

First, on the basis of the image data stored in the image storing section 40, the projecting system including the projection lens 12 projects and displays a first vertical chart image 91 such as the one shown in FIG. 12A, the chart image 91 indicating that the range finding will be finished in three seconds (step D01). The vertical chart image 91 has the light-dark pattern 91a expressing the number "3". Therefore, a user watching the projected image can visually determine, from the shape of the light-dark pattern 91a, that the range finding will be finished in three seconds.

The pattern of the number "3" is first displayed at the beginning of the range finding because the range finding process normally requires about three seconds and because the number is thus counted down starting with "3".

With this vertical chart image 91 with the number pattern projected and displayed, the phase difference sensor 131 for vertical range finding is first driven to read a measurement point P1, an upper point, on the vertical scan line L1. Thus, the distance to the projected image position at the measurement point P1 is measured (step D02).

Subsequently, the first horizontal image 92 shown in FIG. 12B, indicating that the range finding will be finished in three seconds, is selectively read from the image storing section 40 and is then projected and displayed on the screen (step D03). The horizontal chart image 92 has the light-dark pattern 92a expressing the number "3". With this horizontal chart image 92 projected and displayed, the phase difference sensor 132 for horizontal range finding is driven to read a measurement point P4, a left point, on the horizontal scan line L2. Thus, the distance to the projected image position at the measurement point P4 is measured (step D04).

Then, instead of the vertical chart image 92, the second vertical chart image 93 shown in FIG. 12C, indicating that the range finding will be finished in two seconds, is selectively read from the image storing section 40 and is then projected and displayed (step DOS). The vertical chart image 93 has the light-dark pattern 93a expressing the number "2". Therefore, the user watching the projected image can visually determine, from the shape of the light-dark pattern 93a, that the range finding will be finished in two seconds.

With this vertical chart image 93 projected and displayed, the phase difference sensor 131 for vertical range finding is driven to read a measurement point P3, a lower point, on the vertical scan line L1. Thus, the distance to the projected image position at the measurement point P3 is measured (step D06).

Subsequently, the second horizontal image 94 shown in FIG. 12D, indicating that the range finding will be finished in two seconds, is selectively read from the image storing section 40 and is then projected and displayed on the screen (step D07). The horizontal chart image 94 has the light-dark pattern 94a expressing the number "2". With this horizontal chart image 94 projected and displayed, the phase difference sensor 132 for horizontal range finding is driven to read a measurement point P6, a right point, on the horizontal scan line L2. Thus, the distance to the projected image position at the measurement point P6 is measured (step D08).

Then, instead of the vertical chart image 94, the third vertical chart image 95 shown in FIG. 12E, indicating that the range finding will be finished in one second, is selectively read from the image storing section 40 and is then projected and displayed (step D09). The vertical chart image 95 has the light-dark pattern 95a expressing the number "1". Therefore, the user watching the projected image can visually determine, from the shape of the light-dark pattern 95a, that the range finding will be finished in one second.

With this vertical chart image 95 projected and displayed, the phase difference sensor 131 for vertical range finding is driven to read a measurement point P2, a central point, on the vertical scan line L1. Thus, the distance to the projected image position at the measurement point P2 is measured (step D10).

Subsequently, the third horizontal image 96 shown in FIG. 12F, indicating that the range finding will be finished in one second, is selectively read from the image storing section 40 and is then projected and displayed on the screen (step D11). The horizontal chart image 96 has the light-dark pattern 96a expressing the number "1". With this horizontal chart image 96 projected and displayed, the phase difference sensor 132 for horizontal range finding is driven to read a measurement point P5, a central point, on the horizontal scan line L2. Thus, the distance to the projected image position at the measurement point P5 is measured (step D12).

In this manner, as the time for range finding elapses, the vertical chart images 91 to 96 are projected and displayed while being sequentially switched. In the meantime, the two phase difference sensors 131 and 132 are used to execute range finding on the three measurement points P1, P2, and P3 on the vertical scan line L1 and the three measurement points P4, P5, and P6 on the horizontal scan line L2.

In this case, in the vertical direction, the measurement points are read in order of P1, P3, and P2. In the horizontal direction, the measurement points are read in order of P4, P6, and P5. However, the order in which the measurement points undergo range finding is not particularly limited.

Further, in each stage, vertical range finding is carried out before horizontal range finding by projecting the vertical chart image before the horizontal chart image. However, horizontal range finding may be carried out before vertical range finding by projecting the horizontal chart image before the vertical chart image. The resulting distance data on the measurement points P1, P2, P3, P4, P5, and P6 are stored and held in the range finding result storing section 39a, provided in the control section 39.

When the range finding of all the measurement points has been finished, the vertical angle "θv" of the screen projection surface from the projecting optical axis is calculated on the basis of the distance data on the measurement points P1, P2, and P3 stored in the range finding result storing section 39a (step D13). The horizontal angle "θh" of the screen projection surface from the projecting optical axis is calculated on the basis of the distance data on the measurement points P4, P5, and P6 stored in the range finding result storing section 39a (step D14).

Then, the distance to the projected image position at the measurement point P2 or P5, located in the center, is determined to be a distance value representative of the projected image; the distance is measured in step D10 or D12. The lens motor 38 is then used to move the projection lens 12 so that the focused position conforms to the distance value (step D15).

Subsequently, settings described below are made. The followings are determined on the basis of the vertical angle "θv" and horizontal angle "θh" of the screen projection surface on which the images obtained in steps D13 and D14 are projected: at what angle and in which direction the entire screen projection surface is inclined and how to form the projected image into a rectangle with the same appropriate aspect ratio as that of the image signal input. Required keystone correction angles are thus determined. The display encoder 33 is caused to correct the upper, lower, right, and left sides of the image data decompressed and stored in the video RAM 34 (step D16). The control section 39 then ends the process.

As described above, according to the third embodiment, range finding is carried out while projecting and displaying the plurality of chart images having the consecutive number patterns by appropriately switching them. The pattern shapes of the chart images enable the amount of time left before the range finding is finished to be displayed in such a way that the time is counted down. Consequently, the user watching the projected image can realize the amount of time left before the range finding is finished.

In the process shown in FIG. 13, while the vertical chart images 91 to 96 are being sequentially displayed, the range finding process is executed, in the predetermined order, on the six positions including the three vertical measurement points P1, P2, and P3 and the three horizontal measurement points P4, P5, and P6. However, as shown in, for example, FIGS. 14A to 14F, the vertical chart image 91 and horizontal chart image 92 projected and displayed first may be utilized to read the measurement points P1 to P6 at a time. In this case, while an internal calculating process is being executed after the measurement points P1 to P6 have been read, the remaining chart images 93 to 96 are sequentially projected and displayed.

Further, the light-dark patterns of the chart images are not limited to those imitating the numbers. The light-dark patterns may have any shapes provided that the shapes are temporally consecutive.

FIGS. 15A to 15F and 16A to 16F show examples other than the numbers.

FIGS. 15A to 15F correspond to FIGS. 12A to 12F and show how range finding is executed on the measurement points P1, P2, and P3 for vertical range finding and the measurement points P4, P5, and P6 for horizontal range finding in each chart image. FIGS. 16A to 16F correspond to FIGS. 14A to 14F and show how the vertical and horizontal chart images projected and displayed first are used to execute range finding on the measurement points P1, P2, and P3 for vertical range finding and the measurement points P4, P5, and P6 for horizontal range finding at a time.

In FIGS. 15A to 15F and 16A to 16F, reference numerals 101 to 106 denote a vertical and horizontal chart images indicating the elapse of time (countdown) by decrementing the number of marks.

Specifically, light-dark patterns 101a and 102a each including three particular marks are formed in a vertical chart image 101 and a horizontal chart image 102, respectively, which are used to indicate that range finding will be finished in three seconds. Light-dark patterns 103a and 104a each including two particular marks are formed in a vertical chart image 103 and a horizontal chart image 104, respectively, which are used to indicate that the range finding will be finished in two seconds. Light-dark patterns 105a and 106a each including one particular mark are formed in a vertical chart image 105 and a horizontal chart image 106, respectively, which are used to indicate that the range finding will be finished in one second.

By thus carrying out range finding while sequentially switching and displaying the chart images 101 to 106 having these mark patterns, it is also possible to accomplish a countdown display similar to that provided by switching the number patterns. The user can visually determine when the range finding is finished.

The range finding process executed using the chart images 101 to 106 having these mark-shaped patterns is similar to that using the chart images 91 to 96 having the number patterns shown in FIGS. 12F and 14A to 14F. Accordingly, the detailed description of the process is omitted.

In this case, the range finding process requires about three seconds. Thus, the 3-second countdown display is provided using the three types of chart images with the horizontal and vertical patterns. However, it is possible to use more chart images in accordance with the processing time and to carry out range finding while appropriately switching the images.

The present invention is not limited to the above embodiments. Many variations may be made to the embodiments without departing from the spirit of the present invention.

Moreover, each of the above embodiments includes various stages of inventions. Various inventions can be extracted by appropriately combining any of the plurality of components disclosed together. For example, even if some of the components shown in the embodiments are removed, an invention can be extracted from the configuration free from these components if it is possible to solve at least one of the problems described in the problems to be solved by the invention and to produce at least one of the advantages described.

Further, the techniques described in the above embodiments may be applied to various apparatuses by being written, as a program, to a recording medium such as a magnetic disk (a flexible disk, a hard disk, or the like), an optical disk (CD-ROM, DVD-ROM, or the like), or a semiconductor memory. The program may also be applied to various apparatuses by being transmitted using a transmission medium such as a network. A computer realizing the present apparatus executes the above processes by loading the program recorded in the recording medium or provided via the transmission medium and having its operations controlled by the program.

What is claimed is:

1. A projector comprising:
    a storage section which stores a plurality of chart images having respective range finding light-dark patterns expressing particular shapes which are temporally associated with one another;
    a projecting section which reads and projects, in a predetermined order, the chart images stored in the storage section on a surface of a screen;
    a range finding section which measures distances to a plurality of measurement points by sensing the light-dark patterns projected by the projecting section on the image-projected surface of the screen; and
    a chart control section which controllably switches the chart image projected by the projecting section on the screen so that an amount of time left before the range finding is finished can be visually determined from the shape of the light-dark pattern on the image-projected surface.

2. The projector according to claim 1, further comprising:
    an angle detecting section which detects a slope angle of the image-projected surface based on distance data of the distances measured to the measurement points obtained by the range finding section; and a keystone correcting section which carries out keystone correction so that the image projected by the projecting section forms a rectangle with an appropriate aspect ratio, based on the slope angle of the image-projected surface detected by the angle detecting section.

3. The projector according to claim 1, further comprising:

a focusing control section which variably controls a focused position of the image projected by the projecting section, based on distance data corresponding to the distance to a particular one of the measurement points obtained by the range finding section.

4. The projector according to claim 1, wherein the light-dark patterns of the chart images stored in the storage section express consecutive numbers, and the chart control section controllably switches the chart images projected by the projecting section so that the chart images are projected in order of descending number of the consecutive numbers.

5. A range finding processing method comprising:

projecting on a surface of a screen a plurality of chart images having respective range finding light-dark patterns expressing particular shapes which are temporally associated with one another, the chart images being read from a memory in which the chart images are stored, and the chart images being projected in a predetermined order;

performing range finding by measuring distances to a plurality of measurement points by sensing the light-dark patterns of the chart images on the image-projected surface of the screen; and controllably switching the chart image projected on the screen so that an amount of time left before the range finding is finished can be visually determined from the shape of the light-dark pattern on the image-projected surface.

6. A computer-readable recording medium on which a program that is executable by a controller of a projector is stored thereon, the program being executable by the controller to cause the controller to cause the projector to perform functions comprising:

reading, from a memory, a plurality of chart images having respective range finding light-dark patterns expressing particular shapes which are temporally associated with one another, and projecting the chart images on a screen in a predetermined order;

performing range finding by measuring distances to a plurality of measurement points by sensing the light-dark patterns of the respective chart images on image projected surface of the screen; and controllably switching the chart image projected on the screen so that an amount of time left before the range finding is finished can be visually determined from the shape of the light-dark pattern on the image-projected surface.

* * * * *